(12) United States Patent
Ikai

(10) Patent No.: US 8,792,738 B2
(45) Date of Patent: Jul. 29, 2014

(54) IMAGE DECODING APPARATUS AND IMAGE CODING APPARATUS

(75) Inventor: Tomohiro Ikai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 408 days.

(21) Appl. No.: 13/142,027

(22) PCT Filed: Dec. 24, 2009

(86) PCT No.: PCT/JP2009/071482
§ 371 (c)(1),
(2), (4) Date: Jun. 24, 2011

(87) PCT Pub. No.: WO2010/074170
PCT Pub. Date: Jul. 1, 2010

(65) Prior Publication Data
US 2011/0255797 A1 Oct. 20, 2011

(30) Foreign Application Priority Data
Dec. 25, 2008 (JP) ................. 2008-330596

(51) Int. Cl.
*G06K 9/36* (2006.01)
*G06K 9/46* (2006.01)
*H04N 7/12* (2006.01)
*H04N 11/02* (2006.01)
*H04N 11/04* (2006.01)

(52) U.S. Cl.
USPC ..................................... 382/233; 375/240.25

(58) Field of Classification Search
CPC ..................... H04N 7/26888; H04N 19/00909
USPC ....................... 382/232, 233, 236; 348/420.1; 375/240.24, 240.25
See application file for complete search history.

(56) References Cited

U.S. PATENT DOCUMENTS

| 6,167,164 | A | 12/2000 | Lee |
| 6,175,657 | B1 * | 1/2001 | Mancuso et al. ............... 382/261 |
| 6,178,205 | B1 * | 1/2001 | Cheung et al. ........... 375/240.29 |

(Continued)

FOREIGN PATENT DOCUMENTS

| CN | 1492688 A | 4/2004 |
| CN | 1701616 A | 11/2005 |

(Continued)

OTHER PUBLICATIONS

European Search Report for corresponding EP Application No. 09834968.1, dated Nov. 23, 2012.

(Continued)

*Primary Examiner* — Yubin Hung
(74) *Attorney, Agent, or Firm* — Birch, Stewart, Kolasch & Birch, LLP

(57) ABSTRACT

When a filtering process on decoded image data is performed using filter parameters, gradient values near the pixel to be the target of the filtering process are calculated. In accordance with the calculated gradient, a single filter parameter is selected from a set of filter parameters. Based on the selected filter parameter, weight coefficients for the filtering process are calculated. Then, using the pixel value to be the processing target, the surrounding pixel values and the calculated weight coefficients, the pixel value after correction of the processing target pixel is calculated. With this process, it is possible to provide an image coding apparatus that can efficiently code an image properly and an image decoding apparatus that can decode an image, by performing a filtering process in accordance with the image characteristics.

5 Claims, 26 Drawing Sheets

(56) References Cited

U.S. PATENT DOCUMENTS

| | | | |
|---|---|---|---|
| 6,563,958 B1 | 5/2003 | Andrew | |
| 6,748,113 B1 | 6/2004 | Kondo et al. | |
| 7,292,733 B2 | 11/2007 | Monobe et al. | |
| 7,492,950 B2 | 2/2009 | Suzuki et al. | |
| 2001/0017944 A1 | 8/2001 | Kalevo et al. | |
| 2004/0081366 A1 | 4/2004 | Monobe et al. | |
| 2004/0120587 A1* | 6/2004 | Chang et al. | 382/233 |
| 2004/0190787 A1* | 9/2004 | Nakami | 382/260 |
| 2004/0228538 A1* | 11/2004 | Onuma et al. | 382/239 |
| 2005/0100236 A1 | 5/2005 | Kong et al. | |
| 2005/0271288 A1 | 12/2005 | Suzuki et al. | |
| 2006/0110056 A1* | 5/2006 | Gambhire | 382/233 |
| 2006/0233253 A1 | 10/2006 | Shi et al. | |
| 2006/0262987 A1* | 11/2006 | Kadono et al. | 382/246 |
| 2006/0274959 A1 | 12/2006 | Piastowski | |
| 2007/0091997 A1* | 4/2007 | Fogg et al. | 375/240.1 |
| 2007/0183684 A1* | 8/2007 | Bhattacharjya | 382/274 |
| 2008/0049834 A1* | 2/2008 | Holcomb et al. | 375/240.2 |
| 2009/0052555 A1* | 2/2009 | Mak-Fan et al. | 375/240.29 |
| 2009/0316009 A1* | 12/2009 | Ito et al. | 348/208.4 |
| 2010/0074323 A1* | 3/2010 | Fu et al. | 375/240.02 |
| 2010/0142843 A1* | 6/2010 | Chen | 382/261 |

FOREIGN PATENT DOCUMENTS

| | | |
|---|---|---|
| CN | 1860796 A | 11/2006 |
| EP | 1 662 801 A1 | 5/2006 |
| EP | 2 369 844 A1 | 9/2011 |
| EP | 2 369 845 A1 | 9/2011 |
| EP | 2 369 846 A1 | 9/2011 |
| GB | 2 323 235 A | 9/1998 |
| JP | 2000-101850 A | 4/2000 |
| JP | 2001-204029 A | 7/2001 |
| JP | 2004-159311 A | 6/2004 |
| JP | 2005-39766 A | 2/2005 |
| JP | 2007-336468 A | 12/2007 |
| JP | 2008-533863 T | 8/2008 |
| RU | 2295203 C2 | 3/2007 |
| WO | WO 2006/099321 A1 | 9/2006 |

OTHER PUBLICATIONS

Iain E. Richardson, H.264 and MPEG-4 Video Compression: Video Coding for Next-generation Multimedia, Chapter 6, H.264/MPEG4 Part10.

International Search Report for PCT/JP2009/071482 dated Apr. 13, 2010.

Eurasian Search Report dated Mar. 1, 2012 for Eurasian Application No. 201170888.

International Preliminary Report on Patentability and Translation of Written Opinion of the International Searching Authority, dated Aug. 18, 2011, for International Application No. PCT/JP2009/071482 (Forms PCT/IB/338, PCT/IB/373 and PCT/ISA/237).

* cited by examiner

FIG. 4

| r44 | r43 | r42 | r41 | r40 |
|-----|-----|-----|-----|-----|
| r34 | r33 | r32 | r31 | r30 |
| r24 | r23 | r22 | r21 | r20 |
| r14 | r13 | r12 | r11 | r10 |
| r04 | r03 | r02 | r01 | r00 |

FIG. 12

(a) Arithmetic Coding

| 0 | 1 | 3 | 6 | 10 | 16 | 17 | 24 | 25 | 35 | 36 |
|---|---|---|---|----|----|----|----|----|----|----|
| 2 | 4 | 7 | 12| 18 | 19 | 26 | 27 | 37 |    |    |
| 5 | 8 | 13| 20| 28 | 29 | 38 |    |    |    |    |
| 9 | 14| 21| 30| 39 |    |    |    |    |    |    |
| 15| 22| 31|   |    |    |    |    |    |    |    |
| 23| 32|   |   |    |    |    |    |    |    |    |
| 33|   |   |   |    |    |    |    |    |    |    |
| 34|   |   |   |    |    |    |    |    |    |    |

(b) Other than Arithmetic Coding

| 0 | 1 | 3 | 6 | 10 | 11 |
|---|---|---|---|----|----|
| 2 | 4 | 7 | 12|    |    |
| 5 | 8 | 13|   |    |    |
| 9 | 14|   |   |    |    |
| 15|   |   |   |    |    |

```
Header() {
    sizeidx_of_max_block
    numidx_coeff_of_max_block
    scanidx_mode_of_max_block
}
```

IMAGE DECODING APPARATUS AND IMAGE CODING APPARATUS

TECHNICAL FIELD

The present invention relates to an image decoding apparatus or the like that includes a decoding means for decoding a prediction residual signal and a prediction signal from coded data; and a generating means for generating a prediction residual by dequantizing and inverse-transforming the prediction residual signal decoded by the decoding means, to decode image data from the prediction residual and prediction signal.

BACKGROUND ART

Image coding technology has been applied to many familiar video appliances, ranging from television sets to cellular phones which are capable of image processing.

In the field of image coding technology, generally, image data (image information) is divided into a plurality of blocks, orthogonally transformed every divided block. The acquired transform coefficients are quantized and then the quantized transform coefficients are coded by variable-length coding. In this coding method, image degradation occurs due to loss of information during quantization. In particular, serious degradation is prone to occur in images by large distortion (so-called block noise) that generates at the boundaries between individual blocks as the units for implementation of orthogonal transformation. Once a block noise arises at the boundary of each block in the image coding process, block noise also arises when the coded image is decoded so that a user who views the image is liable to feel unnatural. Thus, in order to remove the block noise, block noise arising at the boundary of each block is subjected to a filtering process in a typical image decoding apparatus (or image coding apparatus).

For example, non-patent document 1 discloses a basic filter processing technique. The filter processing technique disclosed in non-patent document 1 will be described hereinbelow with reference to FIG. 26. FIG. 26 is a diagram schematically showing pixels and the pixel values of the corresponding pixels around a block boundary.

It is assumed in FIG. 26 that a block boundary is present between a pixel P0 with a pixel value of p0 and a pixel Q0 with a pixel value of q0 while pixels P1, P2 and P3 and pixels Q1, Q2 and Q3 are located in the order as they go away from the boundary. Also these pixels are assumed to have pixel values p1, p2 and p3 and pixel values q1, q2 and q3, respectively.

In other words, in FIG. 26, among two blocks adjacent to each other along a block boundary, the pixel values of one block are represented by pixel values pk (k is a value defined by the distance from the boundary) while the pixel values of the other block are represented by pixel values qk (k is a value defined by the distance from the boundary). Note that, in FIG. 26, no distinction is made between the boundary in the horizontal direction and the boundary in the vertical direction.

Further, though non-patent document 1 discloses a plurality of filtering processes, in this specification an example of a filter processing using a mode called BS=4 will be described.

In BS=4, the following formula (0-1) and formula (0-2) are used to calculate values "d" and "ap" that represent the conditions of the boundary.

$$d = ABS(p0 - q0) \quad (0\text{-}1)$$

$$ap = ABS(p2 - q0) \quad (0\text{-}2)$$

Then, when the calculated "d" and "ap" satisfy $d < \alpha$ and $ap < \beta$, for $\alpha$ and $\beta$ being predetermined thresholds, the following filtering process is effected:—

$$p0' = (p2 + 2 \times p1 + 2 \times p0 + 2 \times q0 + q1)/8$$

$$p1' = (p2 + p1 + p0 + q0)/4$$

$$p2' = (2 \times p3 + 3 \times p2 + p1 + p0 + q0)/8.$$

Otherwise, the following filtering is implemented:—

$$p0' = (2 \times p1 + p0 + q0)/4$$

In this way, in this technique, the number of taps and coefficients of the filter and the filtering range are varied depending on the magnitude ap of the gradient around the block boundary so as to be able to adaptively modify the strength.

Since a deblocking filter is basically a low-pass filter, the effect of removing block distortion becomes greater the greater the number of taps in the filter and the wider the coverage of the filter is. However, in this case, the image tends to become blurred conversely. Accordingly, it is desired to provide a configuration in which the strength of the filter can be controlled depending on the preferences of the creator or viewer of the movie.

In the technology of non-patent document 1, the degree of filtering can be controlled by adding thresholds $\alpha$ and $\beta$ that control switching of filtering process to a slice header as the information for controlling a slice having a plurality of macro blocks bundled and sending the slice header.

PRIOR ART DOCUMENTS

Non-Patent Document

Non-Patent Document: ISO/IEC14496-10

SUMMARY OF THE INVENTION

Problems to be solved by the Invention

In non-patent document 1, it is possible to control the method of switching the filter process in accordance with the magnitude of gradient, so that it is possible to control the allocation between the degree of blur and the effect of removing block noise. However, the filter coefficients cannot be modified, so that it has been difficult to improve coding efficiency.

Further, since, from among the pixels in the vicinity of the boundary, only the pixels on the side to be filtered are used in calculation of the evaluation of the magnitude of gradient, there has been a problem in that an appropriate filtering cannot be performed when the block size is large.

In view of the above problems, it is therefore an object of the present invention to provide an image coding apparatus that can efficiently and properly code images as well as to provide an image decoding apparatus that can decode images, by performing a filter process in accordance with image characteristics.

Means for Solving the Problems

In order to solve the above problems, an image decoding apparatus of the present invention is an image decoding apparatus including a decoding means that decodes a prediction residual signal and a prediction signal from coded data and a generating means that generates a prediction residual by dequantizing and inverse transforming the prediction residual signal decoded by the decoding means, to decode image data from the prediction residual and the prediction signal, includes a filter parameter storing means that stores a set of filter parameters; and, a filtering means that performs a filtering process on the image data by using the filter parameters stored in the filter parameter storing means, wherein the filtering means includes:

a gradient value calculating means that calculates a gradient value near a pixel to be targeted for a filtering process;

a selecting means that selects one filter parameter from the set of filter parameters, in accordance with the calculated gradient; and, a weight coefficient calculating means that calculates weight coefficients for the filtering process, based on the filter parameter selected by the selecting means.

The image decoding apparatus of the present invention is further characterized in that the decoding means further decodes a set of filter parameters from the coded data, and the filtering means performs the filtering process on the image data, by using the filter parameters decoded by the decoding means.

The image decoding apparatus of the present invention is further characterized in that the decoding means further decodes information on a plurality of blocks of different sizes from the coded data, and the filtering means performs a filtering process on image data for each of the blocks.

The image decoding apparatus of the present invention is further characterized in that the weight coefficient calculating means calculates weight coefficients for the filtering process, in accordance with the filter parameter selected by the selecting means and the distance from a boundary.

An image decoding apparatus of the present invention is an image decoding apparatus including a decoding means that decodes a prediction residual signal and a prediction signal from coded data and a generating means that generates a prediction residual by dequantizing and inverse transforming the prediction residual signal decoded by the decoding means, to decode image data from the prediction residual and the prediction signal, includes a gradient value calculating means that calculates a gradient value near a pixel to be targeted for a filtering process; and, a filtering means that performs the filtering process on the image data, in accordance with the gradient calculated by the gradient value calculating means, wherein the gradient value calculating means calculates a gradient value, based on a magnitude of transform coefficients for the block to be targeted for the filtering process, and the magnitude of difference between the filtering target pixel and pixels in a vicinity of the target pixel.

The image decoding apparatus of the present invention is further characterized in that when a size of a block is a predetermined size or greater, the gradient value calculating means calculates a gradient value, based on the magnitude of transform coefficients for a block to be targeted for the filtering process, or based on a magnitude of the transform coefficients and the magnitude of difference between the filtering target pixel and pixels in a vicinity of the target pixel.

The image decoding apparatus of the present invention is further characterized in that the pixel value calculating means is a means which, when decoding image information that has been coded after being divided into blocks, corrects the pixel value of a processing target pixel that is located near the boundary between a certain block and an adjacent block adjoining the certain block and belongs to the certain block, and, the gradient value calculating means, when the size of the block is a predetermined size or greater, calculates a gradient value, based on the magnitude of the difference in pixel value between two or more pixels belonging to the certain block, or based on the magnitude of the difference in pixel values between two or more pixels belong to the adjacent block.

An image decoding apparatus of the present embodiment is an image decoding apparatus including a decoding means that decodes a prediction residual signal and a prediction signal from coded data and a generating means that generates a prediction residual by dequantizing and inverse transforming the prediction residual signal decoded by the decoding means, to decode image data from the prediction residual and the prediction signal, characterized in that the decoding means includes a decoding means for decoding a flag for switching a variable-length coding method of the prediction residual signal, the prediction residual signal is a signal that has been divided into a plurality of blocks having different sizes, to be coded, the decoding means further includes a decoding means, which is characterized in that, with respect to block sizes greater than a predetermined size, the number of transform coefficients to be included in the coded data becomes smaller than the number of transform coefficients inputted to an inverse transforming means, and which changes the number of the transform coefficients by the flag for switching the variable-length coding method.

An image decoding apparatus of the present invention is an image decoding apparatus including a decoding means that decodes a prediction residual signal and a prediction signal from coded data and a generating means that generates a prediction residual by dequantizing and inverse transforming the prediction residual signal decoded by the decoding means, to decode image data from the prediction residual and the prediction signal, characterized in that the prediction residual signal is a signal that has been divided into a plurality of blocks having different sizes to be coded, the decoding means further includes a decoding means, which is characterized in that, with respect to block sizes greater than a predetermined size, the number of transform coefficients to be included in the coded data becomes smaller than the number of transform coefficients inputted to an inverse transforming means, and which changes the number of the transform coefficients.

An image decoding apparatus of the present invention is an image decoding apparatus including a decoding means that decodes a prediction residual signal and a prediction signal from coded data and a generating means that generates a prediction residual by dequantizing and inverse transforming the prediction residual signal decoded by the decoding means, to decode image data from the prediction residual and the prediction signal, characterized in that the decoding means includes a means which, in decoding the prediction residual signal, changes a location of transform coefficients to be included to the coded data, in accordance with a value of the already decoded prediction residual signals, at a point of time when as many prediction residual signals as a predetermined number or greater have been decoded.

The image decoding apparatus of the present invention is characterized in that the decoding means includes a means which, in decoding the prediction residual signal, calculates an index that is calculated from the linear sum of the decoded prediction residual signals at a point of time when as many prediction residual signals as a predetermined number or greater have been decoded, and a means for changing a location of transform coefficients to be included to the coded data, depending on whether the index is greater than a predetermined value.

An image coding apparatus of the present invention is an image coding apparatus including a decoded image generating means for generating a locally decoded image, includes a gradient value calculating means that calculates a gradient value near a certain calculating target pixel on the locally decoded image;

a learning data calculation storing means that calculates learning data from a value of the pixel to be a calculation target, values of pixels in a vicinity of the pixel and a value of a pixel at a same location as the target pixel of the input image and stores the calculated result for each gradient; and, a filter parameter calculating means that calculates a filter parameter for each gradient, using learning data for each gradient stored by the learning data calculation storing means.

Effect of the Invention

Filter parameters in conformity with the characteristics of an image are determined in accordance with the magnitude of gradient values, and the weight coefficients for a filtering process are controlled based on the filter parameters, whereby it is possible to improve coding efficiency when an image is coded. Further, it is possible to decode the image that has been coded efficiently.

Further, transform coefficients, or not only the pixels of the block on the side to be filtered but also neighboring pixels among the pixels in the vicinity of the boundary, are used for calculation of an evaluation value (gradient value) of the magnitude of gradient, whereby it is possible to exactly measure the characteristics of the block in the vicinity of the filtering target pixel and improve the precision of the filtering process.

Further, by making the number of transform coefficients to be included in image information smaller than the number of transform coefficients input to the inverse transforming means, it is possible to improve efficiency of coding transformation. Further, the number of transform coefficients to be included in image information is changed depending on the method of variable-length coding of transform coefficients, or depending on the flag of frame header, slice header, macro header, block header or the like, whereby it is possible to further improve coding efficiency. It is also possible to improve coding efficiency by changing the locations of transform coefficients of high frequency components in accordance with the decoded values of low frequency components of the decoding target block.

BRIEF DESCRIPTION OF THE DRAWINGS

[FIG. 4] is a diagram explaining filter pixels in the first embodiment.

[FIG. 12] is a diagram for explaining the locations of transform coefficients to be coded, being switched over depending on the method of variable-length coding in the second embodiment.

[FIG. 14] is a diagram explaining a header configuration in the second embodiment.

[FIG. 15] is a diagram for explaining a location of transform coefficients to be coded in the second embodiment.

MODE FOR CARRYING OUT THE INVENTION

First, the embodiments of the present invention will be described with reference to the drawings.

[1. The First Embodiment]

To begin with, an image decoding apparatus to which the present invention is applied will be described as the first embodiment.

[1.1 Image Decoding Apparatus Configuration]

Figure 1:
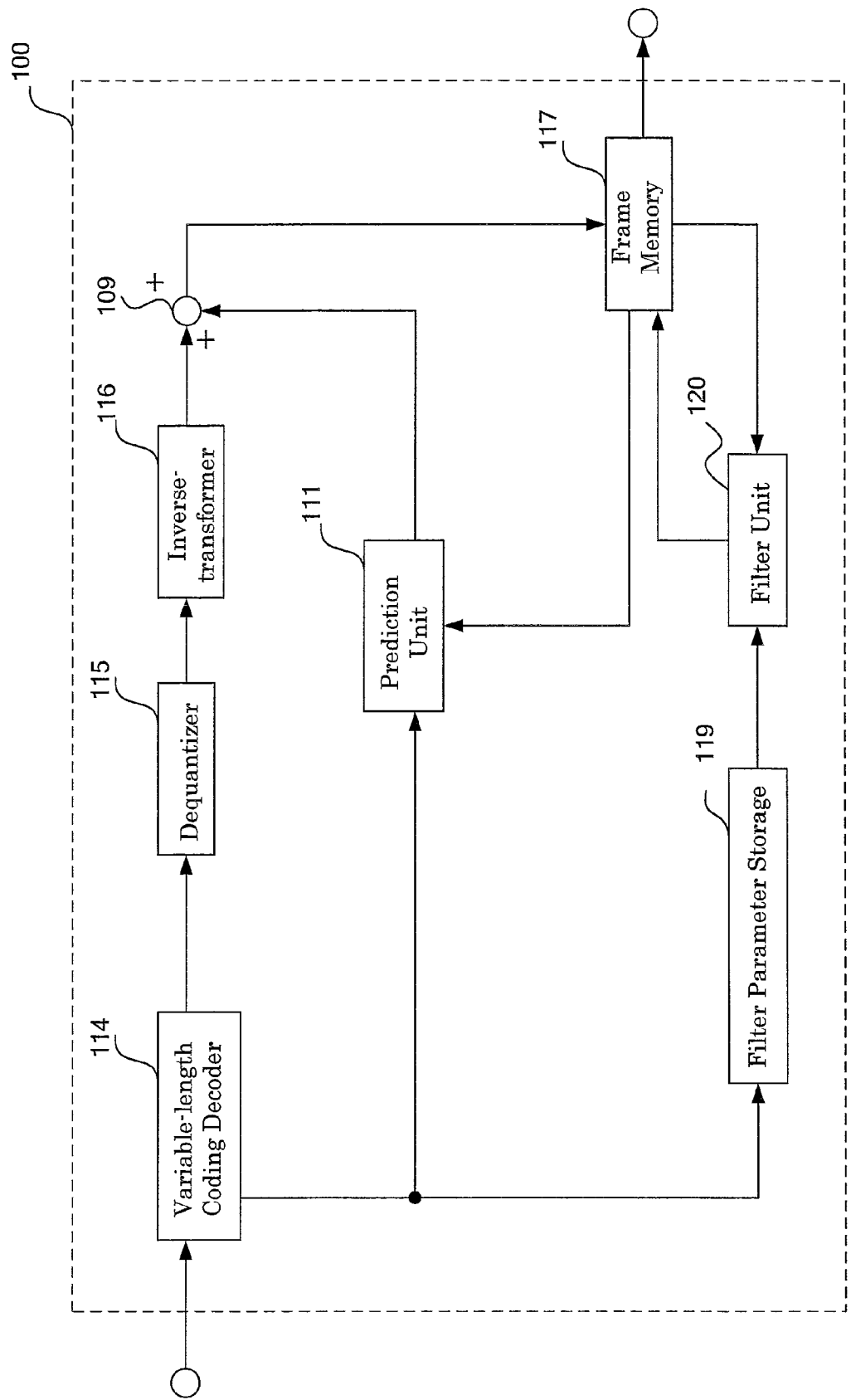
[FIG. 1] is a block diagram showing a configuration of an image decoding apparatus 100 of the first embodiment.

An image decoding apparatus to which the present invention is applied will be described hereinbelow with reference to FIG. 1. FIG. 1 is a block diagram showing a configuration of an image decoding apparatus 100 according to the first embodiment.

As shown in FIG. 1, image decoding apparatus 100 includes a prediction unit 111, a variable-length coding decoder 114, a dequantizer 115, an inverse transformer 116, a frame memory 117, a filter parameter storage 119, a filter unit 120 and an adder 109. The operation of image decoding apparatus 100 will be described hereinbelow.

[1.2 Operation of Image Decoding Apparatus]

The coded data input to image decoding apparatus 100 is supplied to variable-length coding decoder 114 first. Variable-length coding decoder 114 decodes filter parameters as the parameters for designating weight coefficients to be user for filter processing, a prediction signal showing a predicting method and a transformed and quantized prediction residual signal, by variable-length decoding of the coded data.

Dequantizer 115 dequantizes the transformed and quantized prediction residual signal inputted from variable-length coding decoder 114. Inverse transformer 116 inverse-transforms the dequantized signal inputted from dequantizer 115 to produce a prediction residual.

Receiving the prediction signal decoded by variable-length coding decoder 114, prediction unit 111, in accordance with the prediction signal, produces a prediction signal using the decoded image stored in frame memory 117 alone.

Adder 109 adds up the prediction signal inputted from prediction unit 111 and the prediction residual inputted from inverse-transformer 116 to produce a decoded image and stores the decoded image into frame memory 117.

Filter parameter storage 119 receives and stores the filter parameters decoded by variable-length coding decoder 114. Filter unit 120 reads out the filter parameter stored in filter parameters storage 119 and performs a filtering process of the image stored in frame memory 117.

[1.3 Description of Filter Unit]

Herein, filter unit 120 will be described in detail.

Figure 2:
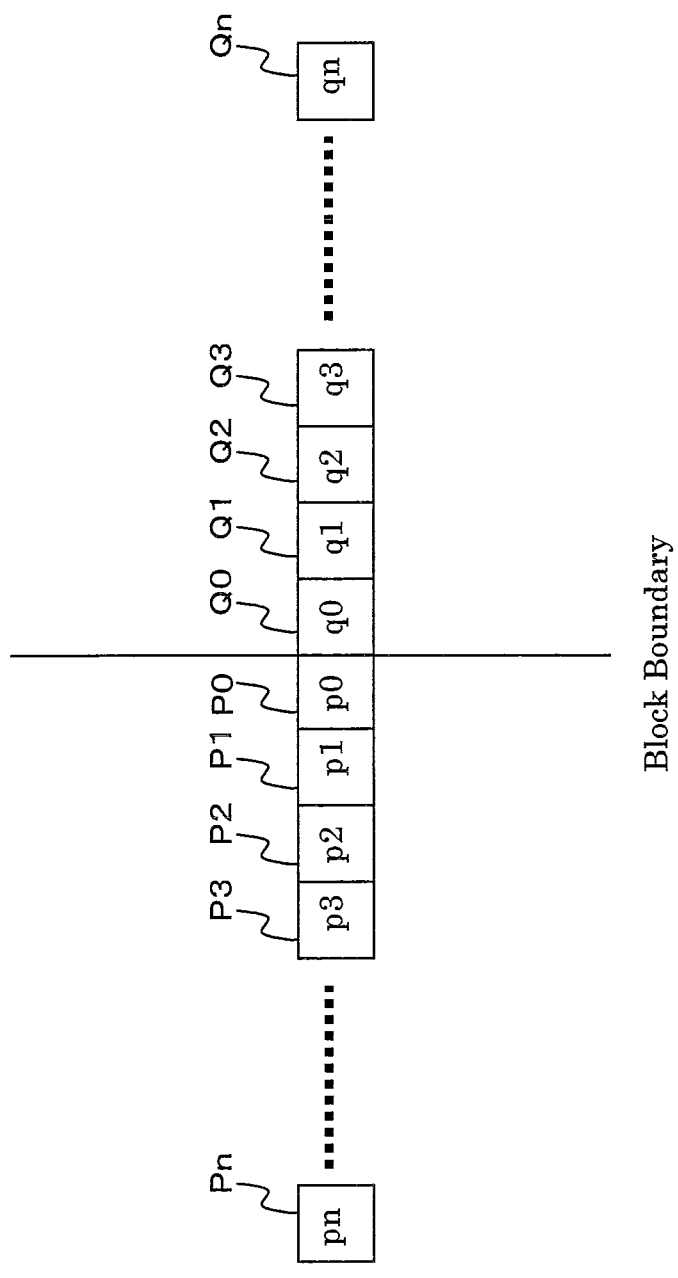
[FIG. 2] is a diagram explaining a boundary in the first embodiment.

FIG. 2 is a diagram schematically showing pixels in the vicinity of a block boundary. In FIG. 2, of two blocks adjacent to each other, the pixels in one block are named pixels Pi and the pixels in the other block are named pixels Qi (i is an integer ranging from 0 to n). Here, i with respect to pixel Pi and pixel Qi corresponds to the distance from the block boundary.

Further in FIG. 2, the pixel values corresponding to pixel Pi and pixel Qi are represented as pixel value pi and pixel value qi. The pixel value of a processing target pixel Pk after processing, corresponding to a pixel value pk before processing is denoted as pk'. Here, k is an integer that can take a value from 0 to equal to or smaller than the block size (k is 0 to n).

Figure 3:
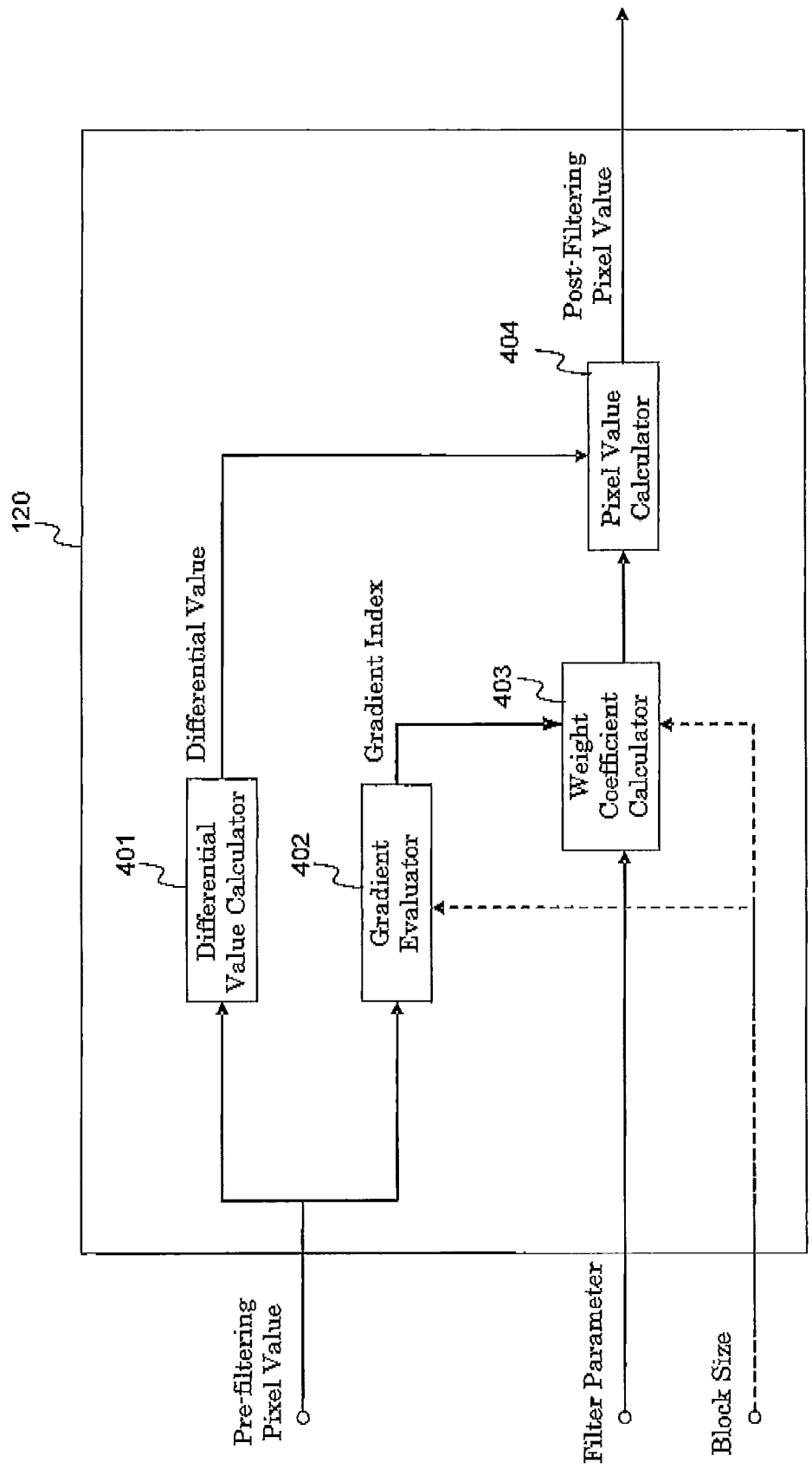
[FIG. 3] is a diagram showing a configuration of a filer unit in the first embodiment.

FIG. 3 is a diagram showing an internal configuration of filer unit 120. Filter unit 120 includes a differential value calculator 401, a gradient evaluator 402, a weight coefficient calculator 403 and a pixel value calculator 404.

Differential value calculator 401 calculates d, the absolute differential value between pixel value p0 at boundary pixel P0 of the target block and pixel value q0 of adjacent pixel Q0 of the adjacent block. That is, differential value calculator 401 calculates an absolute differential value d using $$d = ABS(p0 - q0) \quad (1\text{-}1).$$

The above description has been given taking a case where a filter process is performed by referring to (one-dimensional) pixels in the direction perpendicular to the block boundary, in consideration of reducing block distortion. However, a filter process may be performed referring to two-dimensional pixels in the vicinity of the filtering target pixel.

FIG. 4 is a diagram explaining a two-dimensional filtering target pixel. For a pixel value r22 of a filtering target pixel, differential value calculator 401 calculates d, using $$d = ABS(r22 - r32) + ABS(r22 - r12) + ABS(r22 - r23) + ABS(r22 - r21) \quad (1\text{-}2).$$

[1.4 Description of Pixel Value Calculator]

Pixel value calculator 404 determines whether or not the absolute differential value d calculated at differential value calculator 401 is less than a threshold Th1. That is, it is determined whether d<α holds (α=threshold Th1). When absolute differential value d is less than threshold Th1, that is, when d<α holds, pixel value calculator 404 calculates a post-filtering pixel value pk', from pixel value pk of the filtering target pixel and boundary pixel value q0.

More specifically, post-filtering pixel value pk' is calculated using $$pk' = Wk \times pk + (1 - Wk) \times q0 \quad (1\text{-}3).$$

Wk is a weight coefficient determined by distance k. The weight coefficient Wk uses the value output from weight coefficient calculator 403 described below.

It should be noted that weight coefficient Wk may be handled as an integerized value, instead of a decimal fraction. In this case, the weight coefficient uses a value that is multiplied by the N-th power of 2 (e.g., 32 times). More specifically, calculation is performed using the following formula that is varied from formula (1-3):—

$$pk' = (Wk \times pk + (32 - Wk) \times q0)/32 \quad (1\text{-}4).$$

Here, in the above description, post-filtering pixel value pk' is calculated from two pixel values pk and q0 only, but it is also possible to use a configuration using more pixels.

In this case, pk', the post-filtering pixel value of filtering target pixel Pk is represented as $$pk' = \Sigma \alpha kx \times px + \Sigma \beta kx \times qx + \gamma k \quad (1\text{-}5),$$

using pixel values px (k=0 to l−1), pixel values qx (x=0 to m−1), weight coefficients αkx (x=0 to l−1) for pixel value px, weight coefficients βkx (x=0 to m−1) for pixel value qx, and γk. In this case, (l+m+1) weight coefficients are needed for each distance k from the boundary.

The best case is a case where pk, p0 and q0 are used as the pixel values. In this case, pk' is given as $$pk' = \alpha kk \times pk + \alpha k0 \times p0 + \beta k0 \times q0 + \gamma k \quad (1\text{-}6).$$

When the sum of weight coefficients (αkk+αk0+βk0) is set at 1 and γk=0, pk' is given as follows:—

$$pk' = \alpha kk \times pk + (1 - \alpha kk - \beta 0) \times p0 + pk0 \times q0 \quad (1\text{-}7).$$

The number of weight coefficients is two (αkk and βk0) for each pk.

As shown in FIG. 4, when the filter reference pixels are two dimensional, pixel value calculator 404 determines pixel values r22 after filter processing by linear summation of pixel values rij in the vicinity of the filtering target pixel and weight coefficients αij (where i and j are integers from 0 to 4).

Specifically, calculation is performed using $$r22' = \Sigma \alpha ij \times rij + \gamma.$$

In this case, the number of weight coefficients αij is 25, but it is possible to reduce weight coefficients by using the symmetric properties of pixel positions as follows:—

$$\alpha 4j = \alpha 0j$$

$$\alpha 3j = \alpha 1j$$

$$\alpha i4 = \alpha i0$$

$$\alpha i3 = \alpha i1.$$

In this case, it is possible to reduce the number of weight coefficients to nine.

[1.5 Description of Gradient Evaluator]

Figure 5:
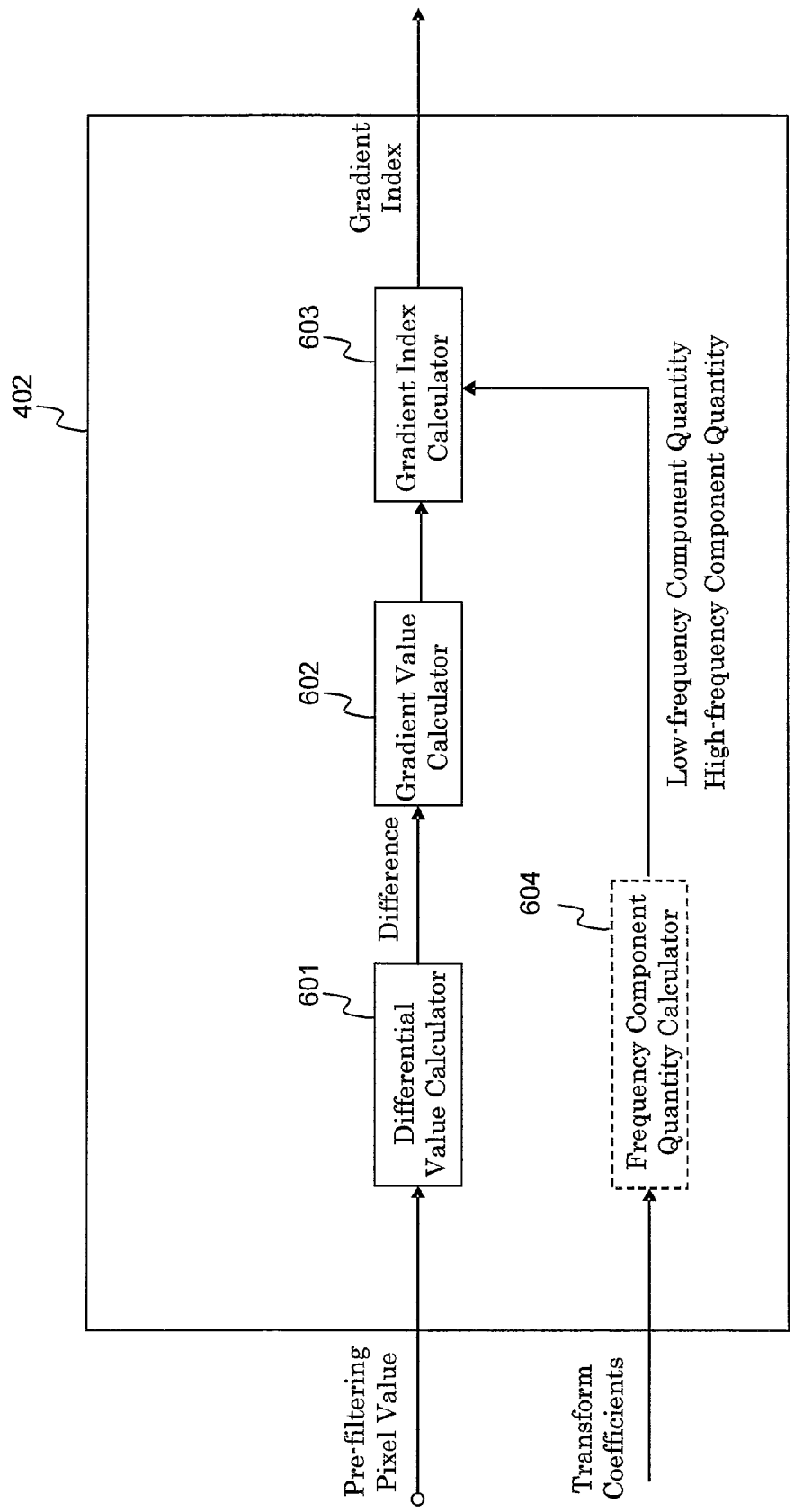
[FIG. 5] is a block diagram showing a configuration of a gradient calculator in the first embodiment.

FIG. 5 is a block diagram showing an internal configuration of gradient evaluator 402. Gradient evaluator 402 includes a difference calculator 601, a gradient value calculator 602 and a gradient index calculator 603. The evaluator may include a frequency component quantity calculator 604 in some cases. Since frequency component quantity calculator 604 will be described in the second embodiment, no description is given herein.

Gradient evaluator 402 of the present embodiment calculates a gradient index as the information representing the magnitude of gradient, using pixel values read out from frame memory 117.

Difference calculator 601 calculates differential values necessary for gradient value calculation, using the pixel values of the filtering target pixel and pixels in the vicinity of the filtering target pixel. In the present embodiment, differential value d_p0p2 is calculated:—

$$d\_p0p2 = ABS(p2-p0).$$

Next, gradient value calculator 602 calculates a gradient value g, using the differential value obtained by difference calculator 601. More specifically, calculation is performed using $$g = d\_p0p2.$$

When filter reference pixels are two dimensional as shown in FIG. 4, difference calculator 601 calculates $$d\_rij = ABS(rij-r22),$$

and gradient value calculator 602 calculates gradient value g, using the differential value obtained by difference calculator 601 as follows:

$$g = d\_r42 + d\_r02 + d\_r24 + d\_r20.$$

Gradient index calculator 603 calculates a gradient index gi from the gradient value obtained at gradient value calculator 602. More specifically, gradient index gi is calculated using the following formula.

$$gi = 0 \ (g = T0)$$
$$= 1 \ (g > T1 \text{ and } g <= T2)$$
$$= 2 \ (g > T2 \text{ and } g <= T3)$$
$$= 3 \ (g > T3).$$

T0, T1, T2 and T3 are predetermined constants to define the thresholds for determination. In the present embodiment, {T0, T1, T2, T3}={0, 2, 4, 6} are used.

[1.6 Description of Weight Coefficient Calculator]

Weight coefficient calculator 403 reads out filter parameters stored for every magnitude of gradient, from filter parameter storage 119. More specifically, filter parameters, K1, K2, . . . , Kn (n is a constant representing the number of parameters) for each gradient index gi are read out.

Weight coefficient calculator 403 calculates weight coefficients to be used for filtering process, from the read filter parameters. The method of calculating the weight coefficients is different depending on the representation format of filter parameters. In the present embodiment, the following representation format a or representation format b is used as the representation format of filter parameters.

(Representation Format a): The filter parameters represent the weight coefficients of filtering process.

(Representation format b): The filter parameters represent the parameters of a formula for calculating the weight coefficients of filtering process.

Which representation format a or b is used to express the filter parameters can be previously determined on the assumption that both the coding apparatus and the decoding apparatus use the same scheme, or may be determined by designating using a flag in the coded data, e.g., a sequence header, picture header or slice header. When a flag in the coded data is used to designate, variable-length coding decoder 114 decodes the flag that shows the representation format from the coded data and outputs the flag to pixel value calculator 404.

Figure 6:
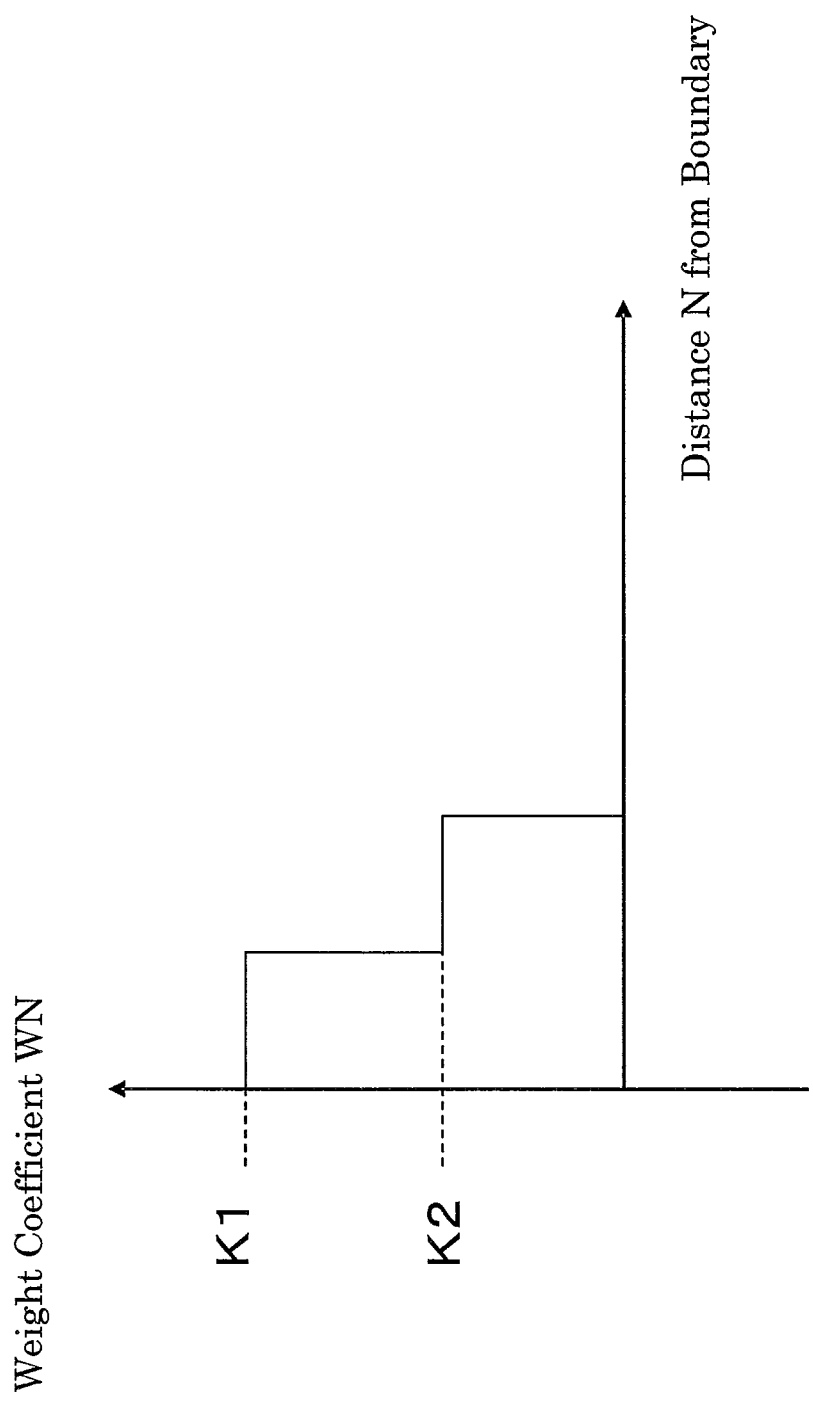
[FIG. 6] is a diagram explaining filter parameters in a representation format a in the first embodiment.

FIG. 6 shows a method of determining a weight coefficient Wk at distance k from the boundary, based on weight parameters K1, . . . , Kn, in the case of representation format a.

Weight coefficient calculator 403 determines Wk as below:

$$Wk = K1 \ (k = 0)$$
$$= K2 \ (k = 1)$$
$$= 0 \ (k >= 2).$$

When the number of weight parameters is n, Wk is determined as below:

$$Wk = Kn \ (k <= n - 1)$$
$$= 0 \ (k >= n).$$

Figure 7:
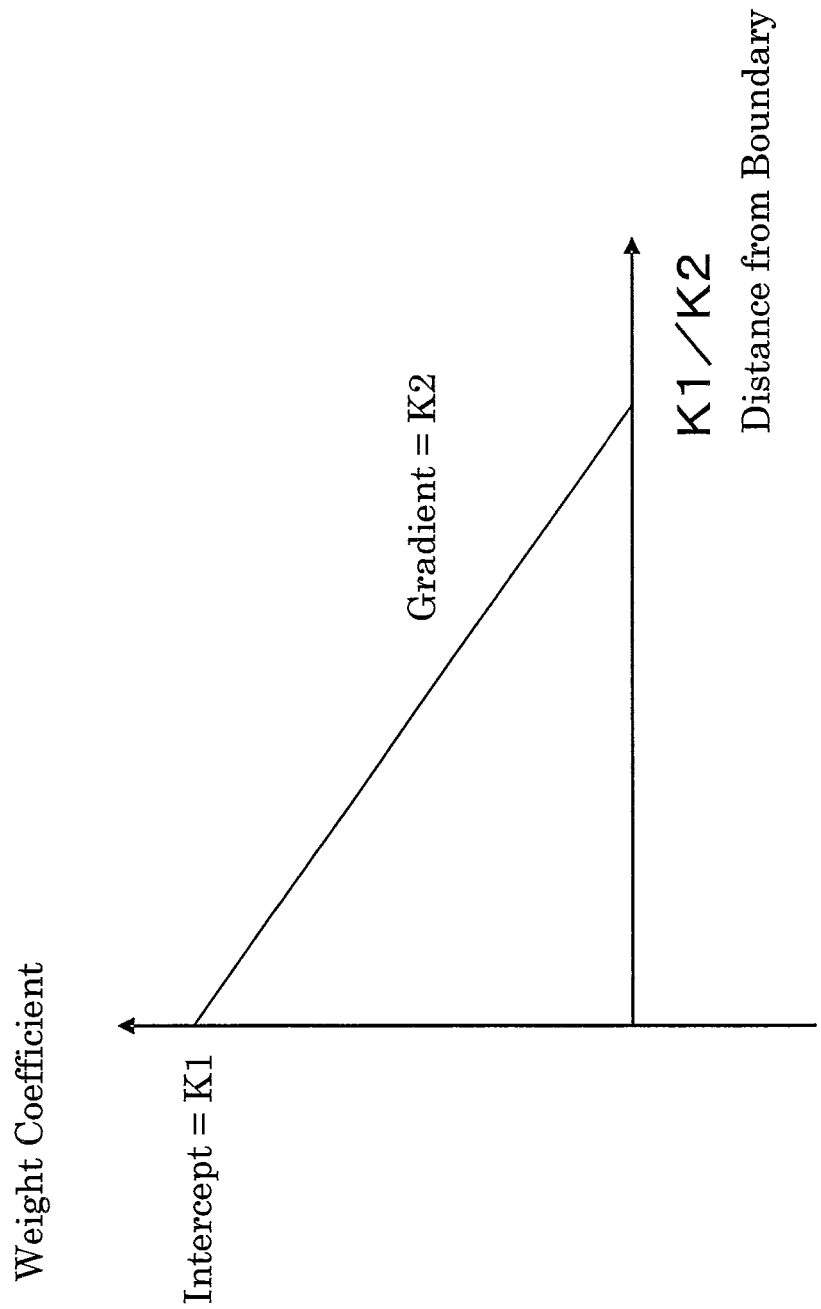
[FIG. 7] is a diagram explaining filter parameters in a representation format b in the first embodiment.

FIG. 7 shows a method of determining a weight coefficient Wk to be used for a filtering process of a pixel Pk, based on filter parameters K1, . . . Kn, in the case of representation format b. In this case, weight coefficient calculator 403 determines Wk as below:

$$Wk = K1 - K2 \cdot \text{times} \cdot k \ (k < K1/K2)$$
$$= 0 \ (k >= K1/K2).$$

Though the above description has been given on the case where only one weight coefficient Wk is determined for pixel Pk as in formula (1-3), there are also cases where a plurality of weight coefficients are needed for pixel Pk as in formulas (1-5) and (1-7). There is a case where (l+m+1) weight coefficients exist, including, for example, αkx (x=0 to l−1) for pixel value pk, βkx (x=0 to m−1) for pixel value qk and γk. In this case, weight coefficient calculator 403 determines (l+m+1) weight coefficients from filter parameters.

More specifically, in representation format a, weight coefficient calculator 403 determines the weight coefficients from filter parameters Kαx1, Kαx2, Kβx1, Kβx2, Kγx1 and Kγx2, as follows:

$$\alpha xk = K\alpha x1 \ (k = 0)$$
$$= K\alpha x2 \ (k = 1)$$
$$= 0 \ (k > 1)$$
$$\beta xk = K\beta x1 \ (k = 0)$$
$$= K\beta x2 \ (k = 1)$$
$$= 0 \ (k > 1)$$
$$\gamma k = K\gamma 1 \ (k = 0)$$
$$= K\gamma 2 \ (k = 1)$$
$$= 0 \ (k > 1).$$

In representation format b, weight coefficient calculator 403 determines the weight coefficients from filter parameters Kαx1, Kαx2, Kβx1, Kβx2, Kγx1 and Kγx2, as follows:

$$\alpha kx = K\alpha x1 + K\alpha x2 \times k \quad (k < K\alpha x1/K\alpha x2)$$
$$= 0 \quad (k >= K\alpha x1/K\alpha x2)$$
$$\beta kx = K\beta x1 + K\beta x2 \times k \quad (k < K\beta x1/K\beta x2)$$
$$= 0 \quad (k >= K\beta x1/K\beta x2)$$
$$\gamma k = K\gamma x1 + K\gamma x2 \times k \quad (k < K\gamma x1/K\gamma x2)$$
$$= 0 \quad (k >= K\gamma x1/K\gamma x2).$$

When two-dimensional 5×5 pixels are given as the filter reference pixels as shown in FIG. 4, weight coefficients $\alpha ij$ in representation format a are determined from filter parameter Kz, where z=i+5×j, as $$\alpha ij = Kz \quad (z = i + 5 \times j, \, i, \, j \text{ are integers from 0 to 4})$$
$$= 0 \text{ (other than the above)}.$$

In representation format b, weight coefficients $\alpha ij$ are determined from filter parameters K1 and K2 as $$\alpha ij = K1 - K2 \times k \quad (k < K1/K2)$$
$$= 0 \quad (k >= K1/K2),$$

where k=ABS(i)+ABS(j).

[1.7 Supplementary Explanation of Weight Coefficient Calculator]

By the way, it is assumed in the above description that in the case of representation format a, there exists a filter parameter corresponding to the weight coefficient of pixel Pk. However, it is not always that the filter parameter corresponding to the weight coefficient of pixel Pk exists.

For example, when distance k is 0, 1, 2, 3, 4 and 5, the weight coefficients of distance k which is 0, 1, 2, 3, 4 and 5 are needed to perform a filter process. However, there is a case where the filter parameters have been given only for the distance which is 1 and 3.

In this case, the weight coefficients are interpolated by linear approximation of the filter parameters nearest to distance k. For example, when the filter parameters W1 and W3 for the distance k from the boundary being 1 and 3 are obtained, linear approximation is performed for the distance from the boundary, which is 0, 2, 4 and 5, by using the values of the filter parameters. More specifically, weight coefficients Wk for the distance k from the boundary, are determined by using filter parameters K1 and K3 and predetermined constants WW0 and WW6, as follows:—

W0=WW0 (K=0)

W1=K1 (K=1)

$W2=(K1+K3)/2$ (K=2)

W3=K3 (K=3)

$W4=(2 \times K3+WW6)/3$ (K=4)

$W5=(K3+2 \times WW6)/3$ (K=5).

Here, predetermined constants WW0 and WW6 are put properly as 0.45 and 0.0, for example.

[1.8 Description of Filter Parameter Storage]

Figure 8:
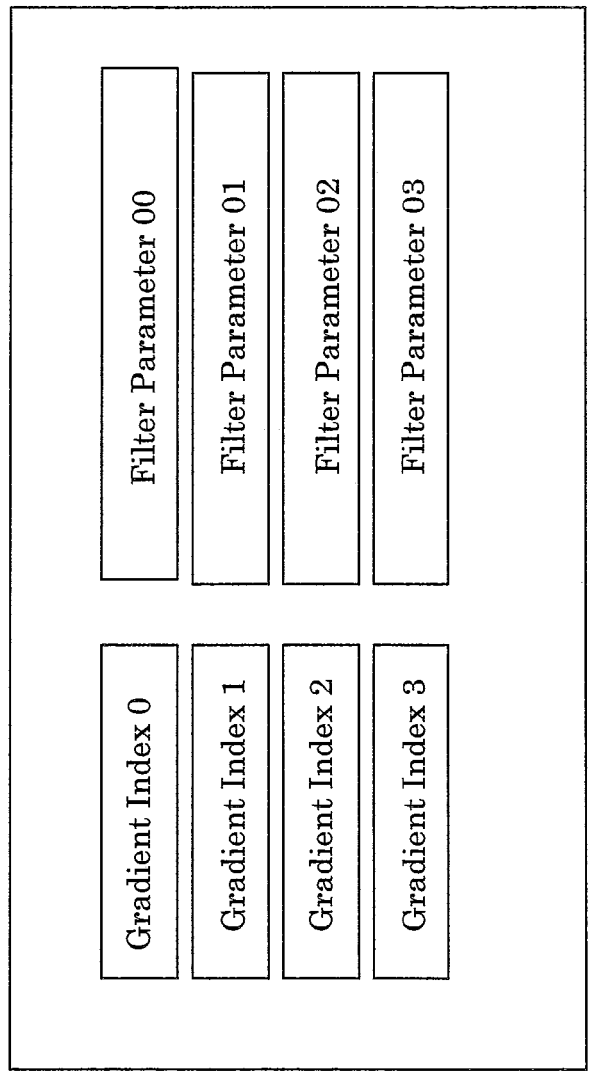
[FIG. 8] is a diagram explaining the operation of a filter parameter storage in the first embodiment.
Figure 9:
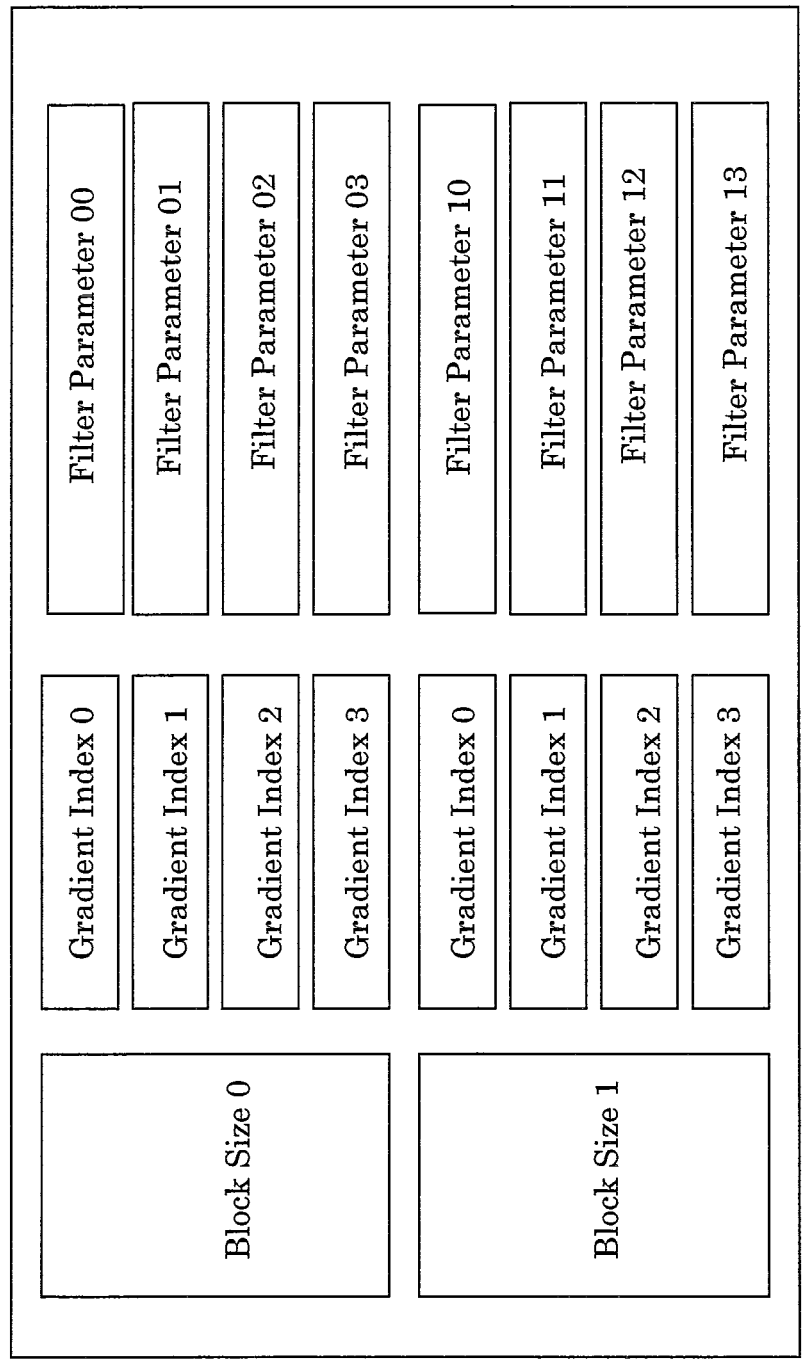
[FIG. 9] is a diagram explaining the operation of a filter parameter storage in the first embodiment.
Figure 10:
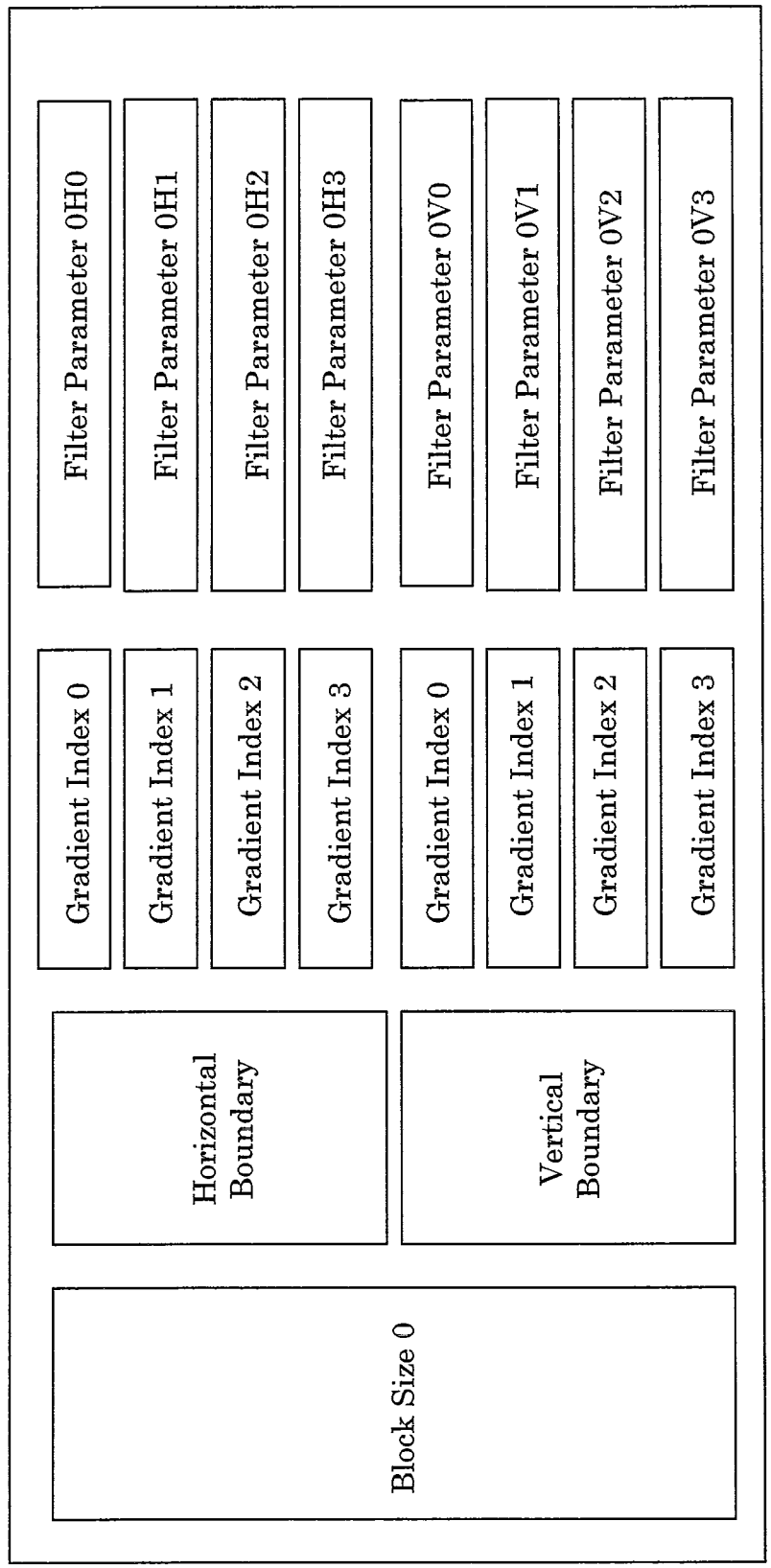
[FIG. 10] is a diagram explaining the operation of a filter parameter storage in the first embodiment.

FIGS. 8, 9 and 10 are diagrams for explaining methods of storing filter parameters in filter parameter storage 119. As shown in FIG. 8, filter parameter storage 119 stores a filter parameter for each gradient index. A filter parameter is a vector having a plurality of values, and given as K1, K2, ..., Kn. Filter parameter storage 119 outputs a filter parameter for each gradient index stored therein to filter unit 120.

Also, it is preferable that filter parameter storage 119 stores learning data for every block size, in accordance with the output from a block size manager 201. In this case, the filter parameter storage separately stores filter parameters in association with individual block sizes and gradient indexes, as shown in FIG. 9.

It is also preferable that the filter parameters are further classified separately as being for horizontal and vertical boundaries and stored, as shown in FIG. 10. It is particularly preferred that the filter parameters are stored being classified according to whether they are for a horizontal boundary or vertical boundary when the block size is large or when the horizontal size and vertical size of the block are different.

As described heretofore, the image decoding apparatus of the first embodiment decodes filter parameters from coded data, reads out the decoded parameters in accordance with the magnitude of gradient calculated from the pixel values at the boundary, and performs filter processing in accordance with the weight coefficients calculated from the read filter parameters, whereby it is possible to perform decoding of an image that is close to the image when the image has been coded.

[2. The Second Embodiment]

Figure 11:
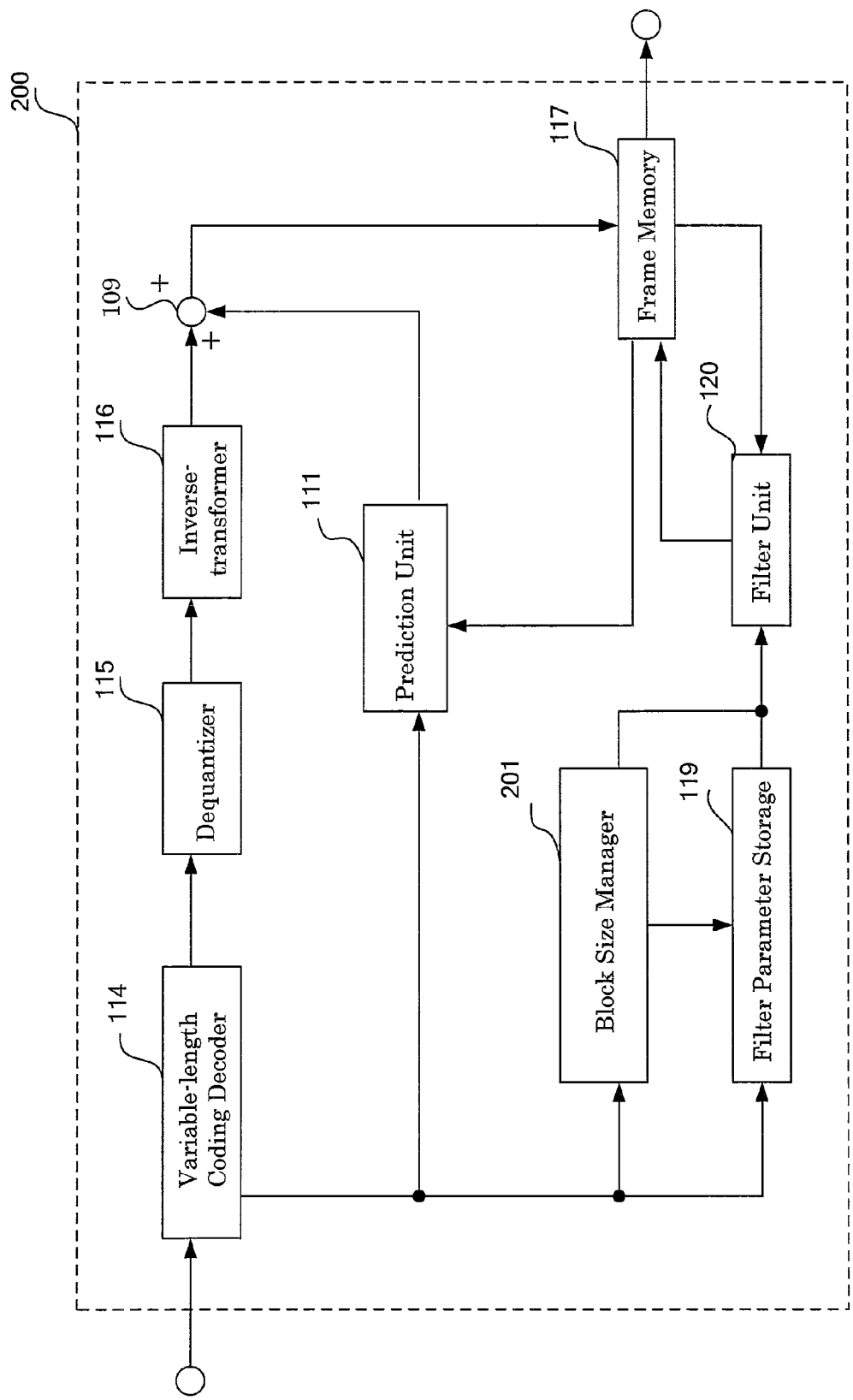
[FIG. 11] is a block diagram showing a configuration of an image decoding apparatus of the second embodiment.

FIG. 11 is a block diagram showing a configuration of an image decoding apparatus 200 of the second embodiment. The same components as those in the first embodiment are allotted with the same reference numerals so that their description is omitted. As shown in FIG. 2, an image decoding apparatus 200 includes a prediction unit 111, a variable-length coding decoder 114, a dequantizer 115, an inverse transformer 116, a frame memory 117, a block size manager 201, a filter parameter storage 119 and a filter unit 120. The operation of image decoding apparatus 200 will be described hereinbelow.

The coded data input to image decoding apparatus 200 is supplied to variable-length coding decoder 114 first. Variable-length coding decoder 114 decodes filter parameters, a prediction signal showing a predicting method, a block size to be used for prediction and transformation and a transformed and quantized prediction residual signal, by variable-length decoding of the coded data. The decoded block size is stored into block size manager 201.

The image decoding apparatus according to the second embodiment changes the operations of prediction unit 111, dequantizer 115, inverse transformer 116 and filter unit 120, in accordance with the block size stored in block size manager 201. Though no block size manager 201 is illustrated for description simplicity in the first embodiment, decoding and filter processing of the coded data that has been coded using a method of making the block size variable (variable block size) will not be impaired.

In the decoding apparatus of the present embodiment, block sizes of 4×4, 8×8, 32×32 and 64×16 are used. Block size M×N indicates a block with M pixels wide and N pixels high.

[2.1 Technique of limiting the number of transform coefficients]

Variable-length coding decoder 114 decodes prediction residual signals. When the block size is of 4×4, 8×8 or 32×32, as many transform coefficients as the block size are decoded.

When the block size is 64×16, a predetermined number of transform coefficients (32 coefficients herein) alone are decoded among 1024 transform coefficients. Also in the coding apparatus that performs coding of the coded data that is decodable in the present embodiment, only the predetermined number of transform coefficients are coded in the case where the block size is 64×16.

Dequantizer 115 and inverse transformer 116 operate in the same manner as described in the first embodiment. Though, in general, the processing amount of inverse transformation becomes greater the greater the block size is, it is possible to reduce the amount of processing at dequantizer 115 and inverse transformer 116 when the block size is 64×16 because it is sufficient enough if only the predetermined number (32 in this embodiment) of transform coefficients can be processed.

The block size pertinent to achieve high coding efficiency is different depending on the characteristics of the image. In general, correlation between pixels increases as the image size becomes greater, so that it is better to enlarge the maximum block size as the image size becomes greater. In practice, making the block size large is effective in improving coding efficiency in plateaus.

However, when the position of the block size is restricted, for example when, as the position inside the frame, the block in question can be used at the positions of integer multiples of the block size, this restriction becomes more severe as the block size becomes greater. In this case, as the block size becomes greater, it becomes difficult to cover plateaus due to restriction on block positions. Therefore, when a plateau region does not continue so long, it is not suitable that one side of the block size exceeds 32 pixels. Accordingly, the maximum block size is as large as 32×32. If a plateau region continues long, the maximum block size may be designated at 64×64 etc.

The pertinent number of transform coefficients in the method of coding only part of transform coefficients is different depending on the characteristics of the image. Since higher-order transform coefficients are needed when an image includes a large gradient of the change in the area other than edge part (the area free from part where pixel values change sharply), it is preferred that a greater number (e.g., 48) of transform coefficients are used, whereas when the gradient is small, a lower number (e.g., 16) of transform coefficients are sufficient.

The pertinent number of transform coefficients is different also depending on the method of variable-length coding for coding transform coefficients. When arithmetic coding of high coding efficiency is used, it is better to use a greater number of transform coefficients (e.g., 40), whereas when arithmetic coding is not used, it is better to use a smaller number of transform coefficients (e.g., 16).

According to one method, in the case where the variable-length coding method includes a flag (which will be called VLC mode flag, hereinbelow) for coded data, when variable-length coding decoder 114 decodes the VLC mode flag that represents the method of variable-length coding, and the VLC mode flag shows a highly efficient variable-length coding method such as arithmetic coding, the number of transform coefficients in the method of coding only part of transform coefficients is set at Nm. When the VLC mode flag shows other than that, the number of transform coefficients is set at Nn (<Nm).

FIG. 12 is a diagram explaining the above-described locations of transform coefficients to be coded, switched over depending on the type of variable-length coding. In the case of arithmetic coding, 40 transform coefficients are decoded as shown in FIG. 12(a), whereas a lower number of transform coefficients than the case of arithmetic coding, specifically 16 transform coefficients are decoded in other cases, as shown in FIG. 12(b).

Figure 13:
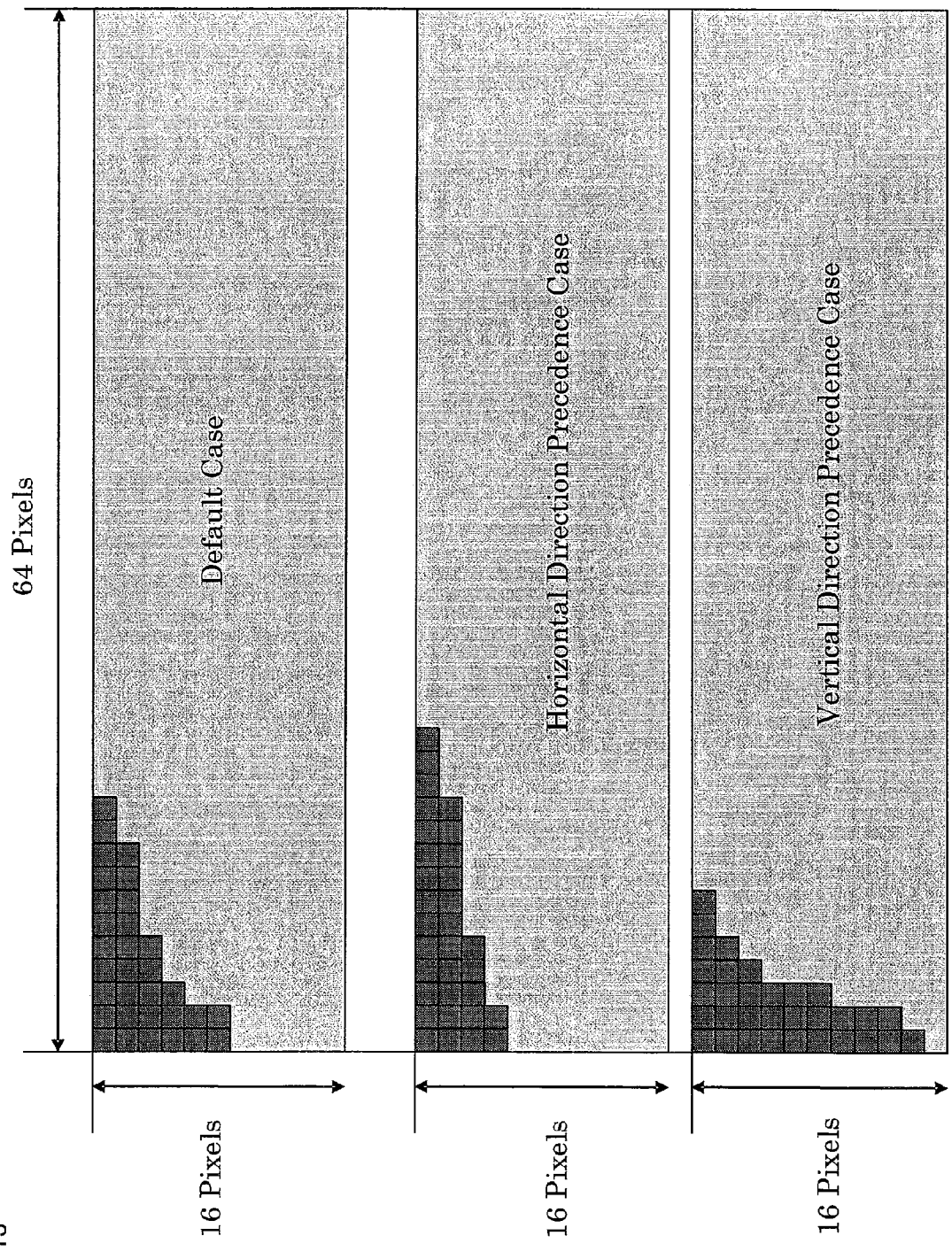
[FIG. 13] is a diagram for explaining the locations of transform coefficients to be coded, in the second embodiment.

FIG. 13 is a diagram for explaining the locations of transform coefficients to be coded. As shown in FIG. 13, the locations of transform coefficients to be coded are changed over between the default, horizontal direction precedence and vertical direction precedence. In this case, if the transform coefficients in a region other than edges are spread in the horizontal direction, it is preferred that the locations of transform coefficients to be coded are allotted in horizontal direction precedence, whereas it is preferred that the positions are distributed in vertical direction precedence if the transform coefficients are spread in the veridical direction. If the transform coefficients are not distributed in any of the directions or are distributed in both directions, it is preferred to use the default positions. Further, other than the horizontal direction precedence and vertical direction precedence, diagonal component precedence may be used.

When the horizontal and vertical positions of a transform coefficient are denoted by h and v, respectively, the horizontal direction precedence indicates a case where Nh, the number of coefficients with h>v is equal to, or greater than, a predetermined number Th plus Nv, the number of coefficients with v>h, or a case where $$Nh-Nv>=Th.$$

The vertical direction precedence indicates a case where Nv, the number of coefficients with v>h is equal to, or greater than, a predetermined number Tv plus Nh, the number of coefficients with h>v, or a case where $$Nv-Nh>=Tv.$$

The diagonal component precedence indicates a case where Nd, the number of coefficients with h=v is equal to, or greater than, a predetermined number Td, or a case where $$Nv-Nh>=Td.$$

FIG. 14 is a diagram showing a configuration of a header that encodes the block size, the number of transform coefficients and the locations of transform coefficients. The "sizeidx_of_max_block" is an index that takes a value of 0 to N−1 to indicate the maximum block size. The formulas for transforming "sizeidx_of_max_block" into the maximum block size are: the block size width=16×"sizeidx_of_max_block" and the block size height=16.

The formulas for determining the maximum block size from "sizeidx_of_max_block" are not limited to the above. The block size width may be determined as 16×"sizeidx_of_max_block" and the block size height as 16×"sizeidx_of_max_block", or otherwise.

The "numidx_coeff_of_max_block" is an index that indicates the number of transform coefficients in the maximum block, and "numidx_coeff_of_max_block"×8 transform coefficients are coded.

The "scanidx_mmode_of_max_block" is an index that takes a value of 0, 1 or 2 to indicate the locations of transform coefficients. "0" indicates the default, "1" the horizontal direction precedence and "2" the vertical direction precedence. Here, instead of allotting a three-level value, a two-level value may be used to switch between the default and the horizontal direction precedence, or between the default and the vertical direction precedence. Alternatively, a four-level value may be used to switch between the default, the horizontal direction precedence, the vertical direction precedence and the diagonal direction precedence.

As shown in FIG. 14, information on the block size (in particular, the maximum block size), the number of transform coefficients, the locations of transform coefficients (e.g., a flag that indicates one of three types of the default, horizontal direction precedence and vertical direction precedence), is preferably encoded in the header for ruling the sequence, header for ruling the frame, slice header, macro block header and block header. Variable-length coding decoder 114 of image decoding apparatus 200 decodes the number of transform coefficients, the locations of transform coefficients, from those coded in these headers, to use decoding of transform coefficients.

Here, instead of explicitly encoding the locations of transform coefficients in the headers, there is a method of changing the locations of transform coefficients of high frequency components, in accordance with the values of the low frequency components, in a variable-length coding method that encodes the transform coefficients in the order from low frequency components to high frequency components.

Figure 15:
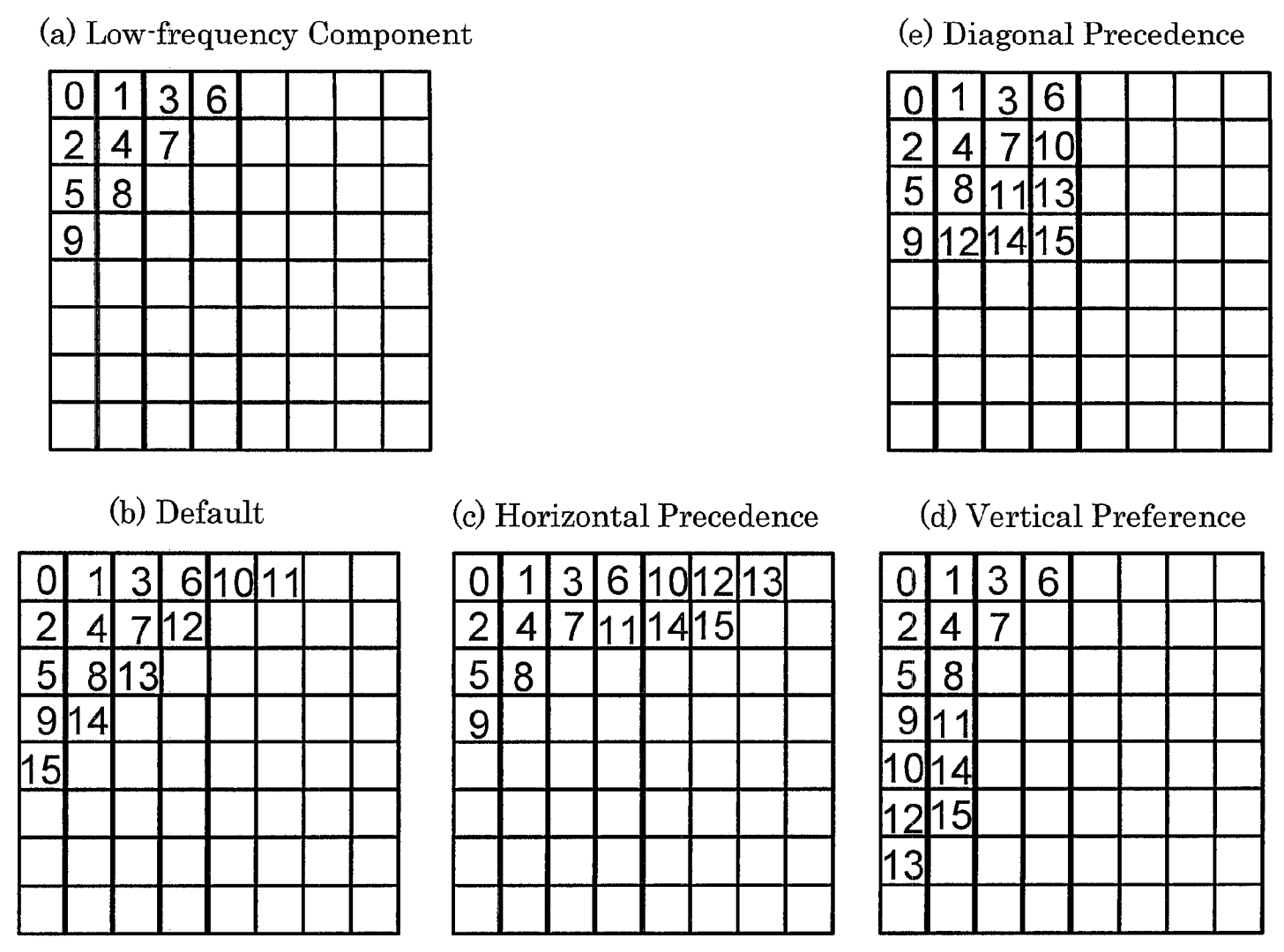

FIG. 15 is a diagram explaining the locations of transform coefficients (=scanning plan) and the order of scanning. The numbers in the drawing indicate the order (scanning order) in which transform coefficients are decoded. The value of the transform coefficient decoded at order m is Cm. FIG. 15(a) shows the low frequency components, (b) the default, (c) horizontal direction precedence, (d) vertical direction precedence and (e) diagonal direction precedence.

Variable-length coding decoder 114 decodes a predetermined number (10 in this case) of transform coefficients. FIG. 15(a) shows an example of locations of a predetermined number of transform coefficients. Variable-length coding decoder 114, when a predetermined number or more of transform coefficients have been decoded, calculates a horizontal direction precedence index H that is calculated as a difference between the absolute values of the transform coefficients that are close to the horizontal direction (h<v) and the weighted, absolute values of the transform coefficients that are close to the vertical direction (v<h), and a vertical direction precedence index V. More specifically, the following values are calculated.

Horizontal direction precedence index H $=ABS(C3)+ABS(C6)-2\times(ABS(C5)+ABS(C9))$.

Vertical direction precedence index V $=ABS(C5)+ABS(C9)-2\times(ABS(C3)+ABS(C6))$.

Here, since the transform coefficients of the lowest orders often little correlate with high order transform coefficients such as taking large values even when no high order transform coefficients exist, calculation of horizontal direction precedence index H and vertical direction precedence index V is preferably performed by using transform coefficients other than those of the lowest orders, i.e., the transform coefficients other than C1 and C2.

When the size of the block width and the size of the height are different, it is preferable that the weights used for calculation of horizontal direction precedence index H and the weights used for calculation of vertical direction precedence index V are designated so that the weights for the absolute values of transform coefficients close to the horizontal direction and the weights for the absolute values of transform coefficients close to the vertical direction will be made different or will not be allotted symmetrically.

For example, when the size of the block width is greater than the size of the height, it is preferable that the ratio HR (=HSumV/HSumH), which is used for calculation of horizontal direction precedence index H, between HSumV, the sum of the weights for the transform coefficients close to the vertical direction and HSumH, the sum of the weights for the transform coefficients close to the horizontal direction is made greater than the ratio VR (=VSumH/HSumV), which is used for calculation of vertical direction precedence index V, between VSumV, the sum of the weights for the transform coefficients close to the vertical direction and VSumV, the sum of the weights for the transform coefficients close to the horizontal direction. When the size of the block width is smaller than the size of the height, the condition is reversed.

More specifically, when the block has a size of 64×16, the indexes are preferably specified as follows:—

Horizontal direction precedence index H $=ABS(C3)+ABS(C6)-4\times(ABS(C5)+ABS(C9))$.

Vertical direction precedence index V $=ABS(C5)+ABS(C9)-(ABS(C3)+ABS(C6))$.

At this time, HR=HSumV/HSumH=(4+4)/(1+1)=4, and VR=(1+1)/(1+1)=1, and the above description holds.

When horizontal direction precedence index H is greater than 0, variable-length coding decoder 114 selects horizontal direction precedence for the locations of transform coefficients of high frequency components. When the vertical direction precedence index V is greater than 0, vertical direction precedence is selected for the locations of transform coefficients of high frequency components. Other than these, default is selected.

Variable-length coding decoder 114 rearranges the locations of transform coefficients to the locations defined by the selected scan direction and outputs the transform coefficients to dequantizer 115.

Figure 16:
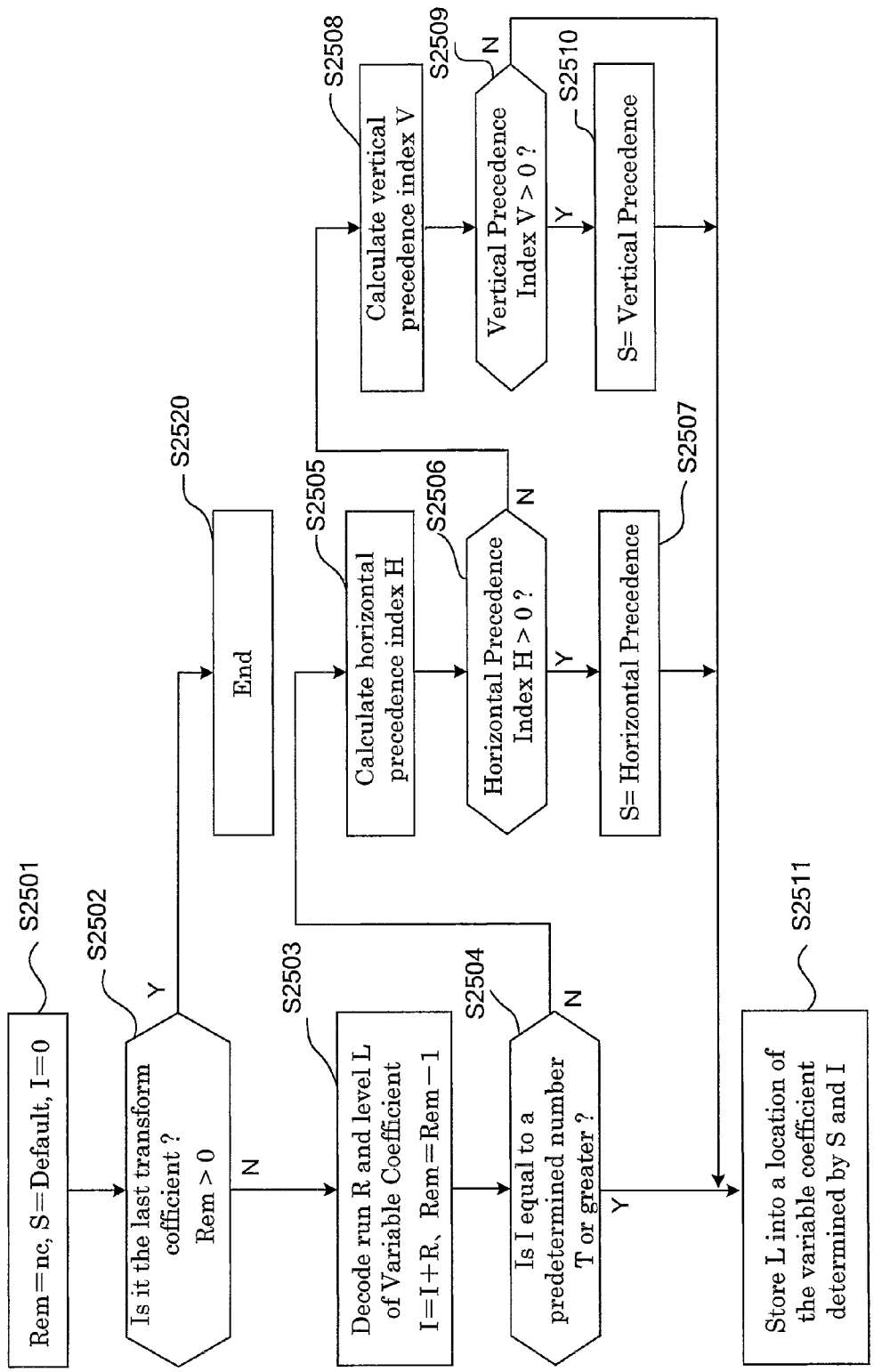
[FIG. 16] is a diagram explaining the method of selecting the location of transform coefficients to be coded in the second.

FIG. 16 is a diagram explaining the operation of the above-described variable-length coding decoder 114. Variable-length coding decoder 114 is assumed to decode nC, the number of transform coefficients first, then decode run R, the information on the locations of transform coefficients and levels L showing the values of transform coefficients.

It is also possible to use a method that will not decode nC, the number of transform coefficients first, by decoding a value called last Last. In this case, in the following steps, the determination on the last transform coefficient should be modified from determining whether Rem is 0 to determining whether Last is true.

S2501: Set Rem, the number of remnant of transform coefficients at nC, the default for scanning plan S, and scan location I at 0.

S2502: When the transform coefficient is the last one (Rem=0), the control goes to S2520 to end decoding. When the transform coefficients is not the last one (Rem>0), the control goes to S2503.

S2503: Decode run R of the transform coefficient and level L, and update scan location I and the number of remnant transform coefficients, Rem, by setting I=I+R and Rem=Rem−1.

S2504: When location I of the transform coefficient is equal to or greater then a predetermined number T, the control goes to S2511. When location I is less than the predetermined number T, the control goes to S2505.

S2505: Calculate horizontal direction precedence index H.

S2506: When horizontal direction precedence index H is greater than 0, the control goes to S2507. Otherwise, the control goes to S2508.

S2507: Set the horizontal direction precedence for scanning plan S.

S2508: Calculate vertical direction precedence index V.

S2509: When vertical direction precedence index V is greater than 0, the control goes to S2510. Otherwise, the control goes to S2511.

S2510: Set the vertical direction precedence for scan plan S.

S2511: Store the level L that is obtained at S2503 into the location of the transform coefficient defined based on scanning plan S and scanning position I. As the options of scanning plan S, it is also preferable that diagonal direction precedence is added in addition to horizontal direction precedence and vertical direction precedence.

[2.2 Block Size Setting Method]

Figure 17:
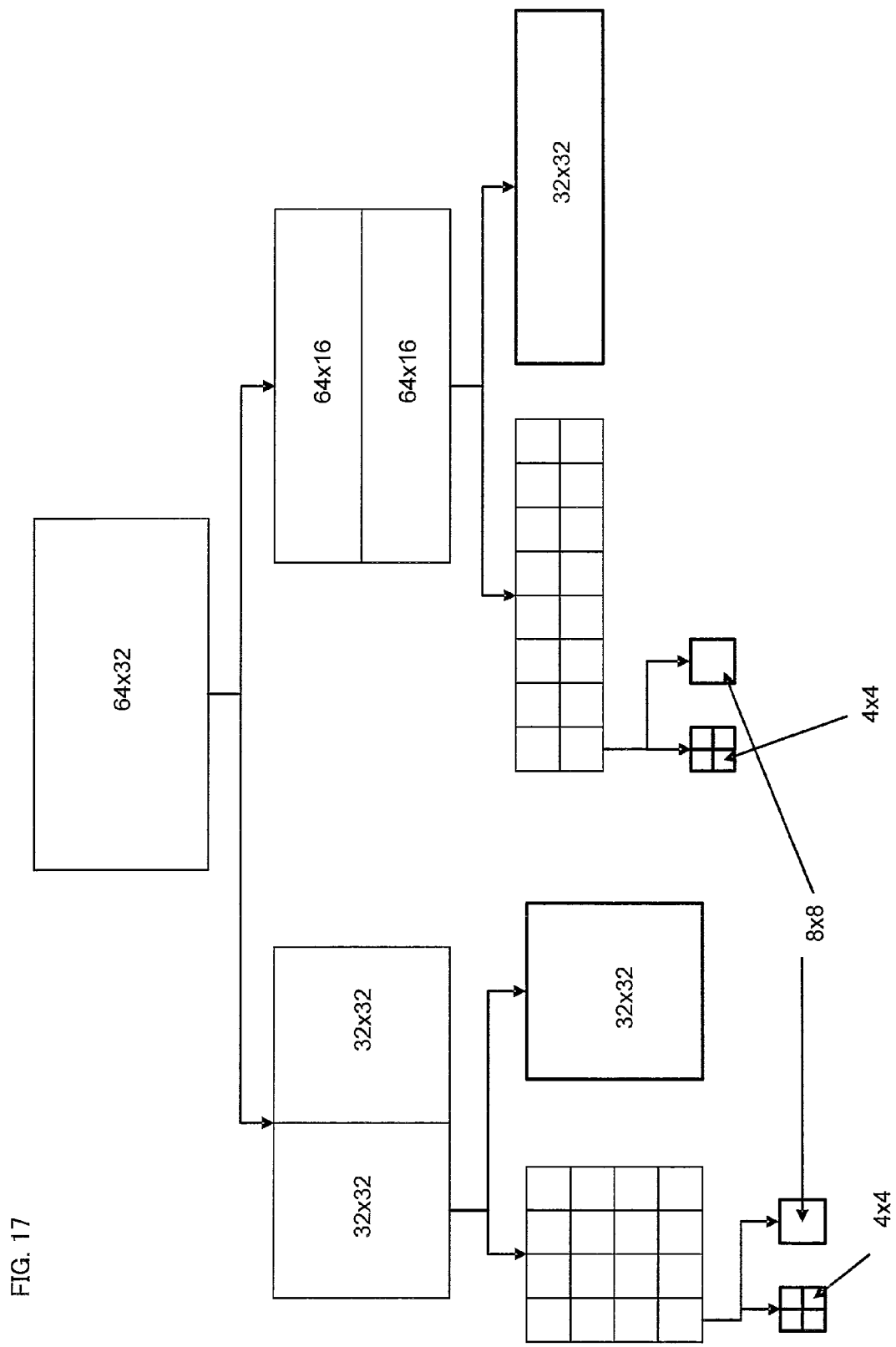
[FIG. 17] is a diagram showing a method of setting up a block size in the second embodiment.
Figure 18:
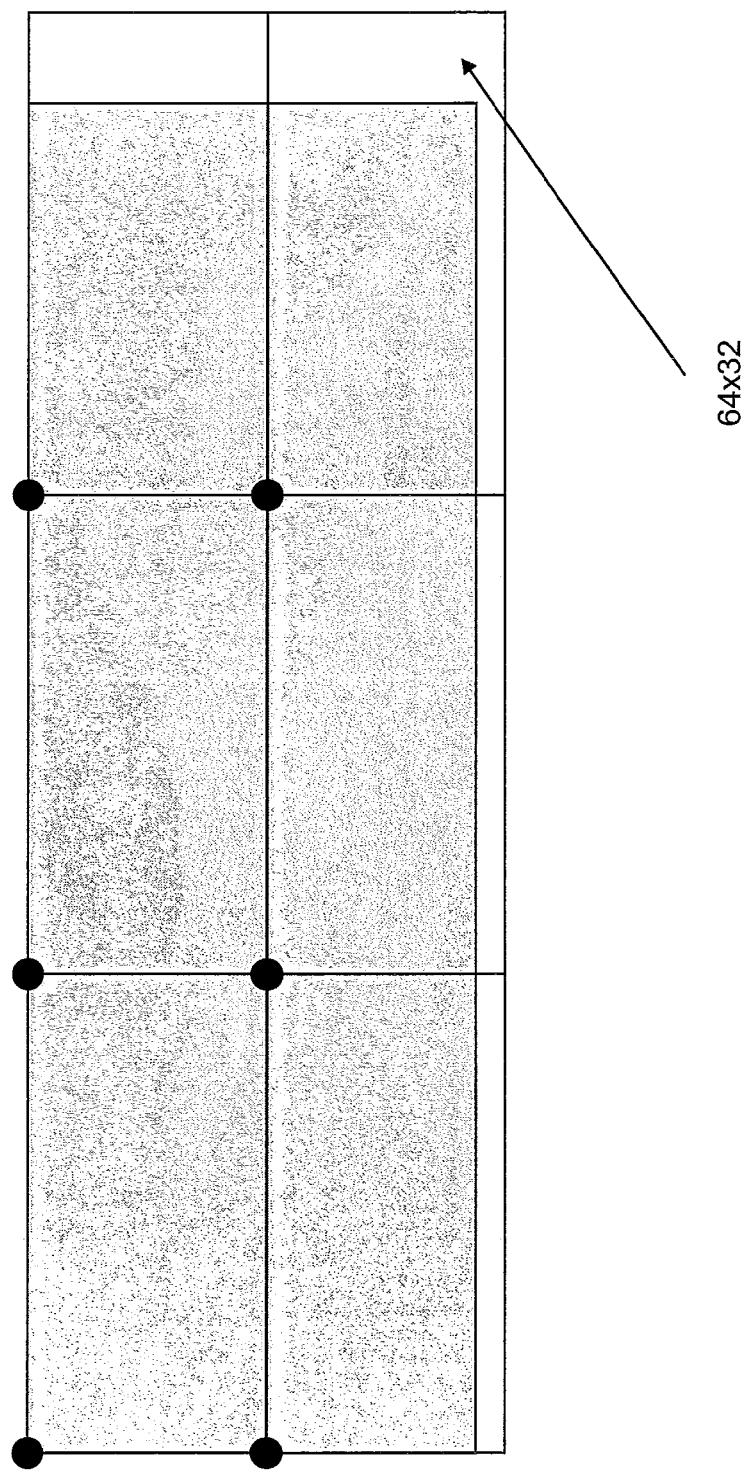
[FIG. 18] is a diagram showing a method of setting up a block size in the second embodiment.
Figure 19:
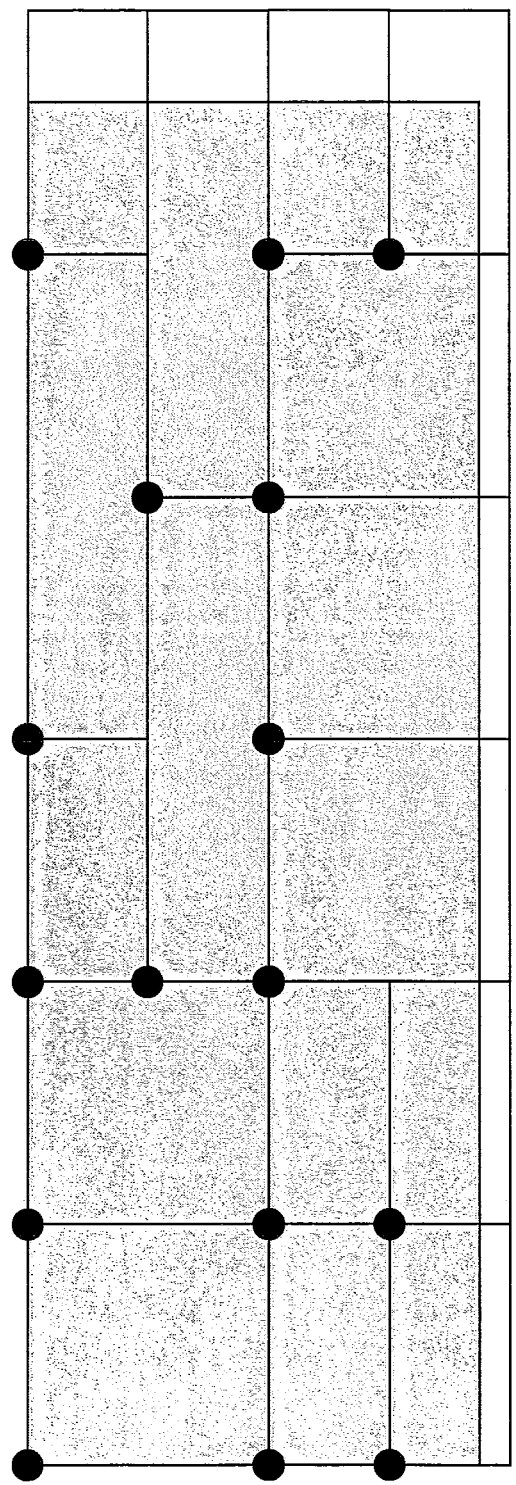
[FIG. 19] is a diagram showing a method of setting up a block size in the second embodiment.

FIGS. 17, 18 and 19 are diagrams showing a method of setting block size. In the method shown in FIGS. 13 and 14, a constant multiple of the block size of the least common multiple of the used block sizes, 4×4, 8×8, 32×32 and 64×16 is used as a macro block (64×32 herein). In this case, the screen is divided into macro blocks as shown in FIG. 18 so as to perform processing every macro block.

The screened area in FIG. 18 is the input screen. The macro blocks are formed so as to cover the screen. When the area of a macro block spread beyond the screen such as being the edge of the screen etc., decoding is implemented for the whole macro block, and the screen area is picked up to be output to the outside at the time of output from the image decoding apparatus. In FIG. 18, the upper left coordinate point of each macro block is shown with a black spot.

As shown in FIG. 17, the interior of a divided 64×32 macro block is further divided into 32×32 or 64×16 blocks. The divided 32×32 and 64×16 blocks are further divided into smaller blocks. The macro block is finally divided into 4×4, 8×8, 32×32 and 64×16 blocks. This is called a method by tree decomposition.

The method shown in FIG. 19 is a different method from the tree decomposition. A macro block size is set at a certain block size, not based on a constant multiple of the block size of the least common multiple of the block sizes to be used. Herein, for example 32×16 is set for a macro block. The screen is scanned in raster order in units of this macro block, and 64×32 block, 32×32 block and macro block (32×16) are selected by this unit. The area selected as a macro block is further divided into 4×4 or 8×8.

Once a block size is selected, the area already selected (64×16 or 32×32 or 32×16) is skipped and then the screen is scanned in raster order, so as to select a block size from 64×32 block, 32×32 block and macro block (32×16), once again. This scan is repeated within the screen to thereby divide the whole screen into blocks. Since this method enables determination of blocks of a large block size, using smaller units than that in the tree division, this method is called a large block precedence technique.

In the above way, the large block precedence gives greater flexibility in determining a block dividing method than the tree division, though the quantity of codes for determining a block dividing method becomes greater.

[2.3 Description of Filter Unit]

Filter unit 120 of the second embodiment also includes a differential value calculator 401, a gradient evaluator 402, a weight coefficient calculator 403 and a pixel value calculator 404.

Gradient evaluator 402 of the second embodiment calculates the gradient value using pixel values read out from frame memory 117, in a method different depending on each block size read out from block size manager 201.

Difference calculator 601, as a component of gradient evaluator 402, calculates differential values necessary for gradient value calculation. More specifically, the following differential values are calculated.

$$d\_p0p2 = ABS(p0-p2)$$

$$d\_p0p4 = ABS(p0-p4)$$

$$d\_p0p8 = ABS(p0-p8)$$

$$d\_p2p4 = ABS(p2-p4)$$

$$d\_p4p8 = ABS(p4-p8)$$

$$d\_q0q8 = ABS(q0-p8)$$

Gradient value calculator 602 calculates a gradient value using the differential values, in a different method depending on each block size.

More specifically, when the block size is 4×4 or 8×8, $$g = d\_p0p2,$$

when the block size is 32×32, $$g = d\_p0p4 + d\_p4p8.$$

When the block size is 64×16, $$g = d\_p0p2 + d\_p2p4$$

is used for horizontal boundary, and $$g = d\_p0p8 + d\_q0q8$$

is used for vertical boundary.

As is done in the above calculating method, the gradient value is calculated using the differential values between pixels that are located more apart from each other as the block size becomes greater. Because a block as its size becomes greater is more likely to be used for a flat area, this is to deal with the fact that for flat areas a significant differential value will not occur unless pixels that are located a predetermined distance or longer apart from each other are used. When the width and height of the block are different, the gradient value is calculated in accordance with the width for a process for vertical boundary while the gradient value is calculated in accordance with the height for a process for horizontal boundary.

In a case where the block size is equal to or greater than a predetermined value, in the case of 64 or greater in the present embodiment, not only the pixel values (pk) of the blocks on the side of the filtering target pixel but the pixel values (qk) of the adjacent block are also referred to. This is because when the block size is specially big, the blocks are often used for an area with a very high degree of flatness so that it is impossible to measure the characteristics of the block correctly enough by only referring to one side of the adjacent blocks across the boundary.

When the gradient value is calculated referring to the pixel values of the filtering target block and adjacent block, it is preferable that the number of pixel values to be referred to on the side of the filtering target block is made large. That is, it is preferable in gradient value calculation that the number of differential values calculated from the filtering target block is made larger than the number of differential values calculated from the adjacent block. In this case, the gradient value is calculated by the following formula, for example.

$$g = d\_p0p4 + d\_p4p8 + d\_q0q8$$

For a block size of 64×16, the number of transform coefficients to be decoded is limited to a predetermined number. Since the block with the number of transform coefficients limited is often used for an area where the degree of flatness is markedly high, it is preferable that the gradient value is calculated by referring to the pixel values of the block on the opposite side of the filtering target pixel.

Gradient evaluator 402 calculates a gradient index from gradient value g. For example, gradient index gi is calculated by the following formula.

$$gi = 0 \ (g = T0)$$
$$= 1 \ (g > T0 \text{ and } g <= T1)$$
$$= 2 \ (g > T1 \text{ and } g <= T2)$$
$$= 3 \ (g > T3)$$

where T0, T1, T2 and T3 are predetermined constants that give thresholds for determination.

The values of T0, T1, T2 and T3 may be changed depending on the block size. In the present embodiment,
{T0, T1, T2, T3}={0, 3, 6, 12}
  . . . block size 4×4, 8×8
{T0, T1, T2, T3}={0, 2, 4, 6}
  . . . block size 32×32, 64×16
are used.

[2.4 Gradient Value Calculation using Transform Coefficients]

Gradient evaluator 402 not only calculates gradient values based on the pixel values read out from frame memory 117, but further includes frequency component quantity calculator 604 as shown in FIG. 5 so as to be able to use information on the transform coefficients output from inverse transformer 116.

Figure 20:
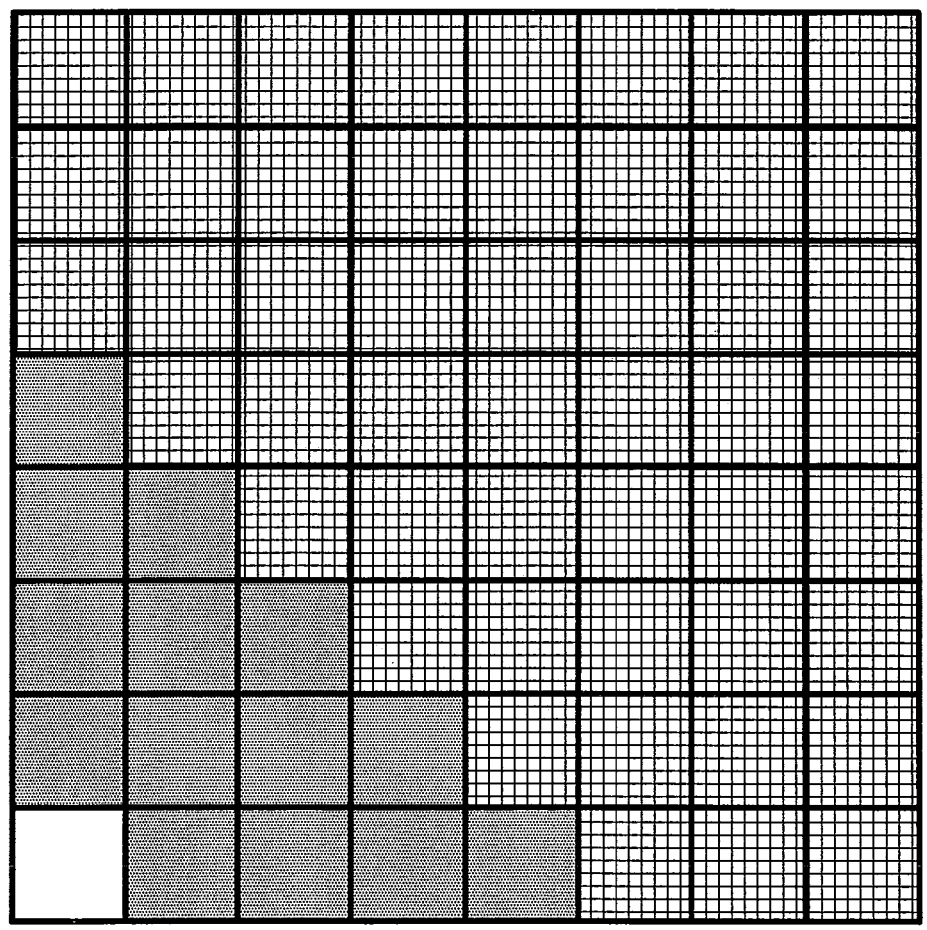
[FIG. 20] is a diagram explaining the operation of a frequency component calculator in the second embodiment.

FIG. 20 is a diagram for explaining the operation of frequency component quantity calculator 604. Frequency component quantity calculator 604 calculates the sum of the absolute values of transform coefficients for each region of transform coefficients. More specifically, the low frequency component quantity is calculated using the transform coefficients located in the area shown by the fine screen in FIG. 20 while the high frequency component quantity is calculated using the transform coefficients located in the area shown by the rough screen in FIG. 20. Calculation of the low frequency component quantity and the high frequency component quantity may be given by the sum of squares, the maximum value of absolute values, the maximum value of square values or other values, not limited to the sum of absolute values.

Gradient value calculator 602 calculates a gradient index based on the low frequency component quantity, the high frequency component quantity and the different value. More specifically, a gradient index gi is calculated by the following formula:—

$$gi = 0 \ (\text{low frequency component quantity} <= TL0 \text{ and high}$$
$$\text{frequency component quantity} <= TH0),$$
$$= 1 \ (\text{other than the above, low frequency component}$$
$$\text{quantity} <= TL1 \text{ and high frequency component}$$
$$\text{quantity} <= TH1),$$
$$= 2 \ (\text{other than the above, } d\_p0p2 <= T1 \text{ and } d\_p0p2 <= T2),$$
$$= 3 \ (\text{other than the above}).$$

Here, TL0, TH0, TL1 and TH1 are predetermined constants that define thresholds for determination, and take values such as TL0=50, TH0=50, TL1=200, TH1=50, for example.

In this method, the gradient index is determined based on the magnitude of the transform coefficients when the low frequency component quantity and high frequency component quantity are low and the gradient index is determined based on the difference between pixel values, independently from the magnitude of the transform coefficients.

It should be noted that the method of determining the magnitude of gradient using transform coefficients (determination of gradient index in the above description) is effective when the block size is large. Accordingly, it is preferable that the above method is used when the block size is large or for the cases of 32×32 and 64×32, for example and a method using no transform coefficients is used otherwise. The reason is that blocks of large size is often used for areas where correlation between pixels is strong, and in that case, the magnitude of transform coefficients well demonstrates the characteristics of the block.

By the way, blocks of large size may be used not only for areas where correlation between pixels is strong, but also used for an area including repeated patterns. In such cases, it is impossible to sufficiently depict the gradient of a local area in the block by means of transform coefficients alone. However, in an area where repeated patterns exist, the quantity of high-frequency component is usually large, and in this case, in the above method the gradient index is calculated using differential values. Accordingly, this problem will not occur.

The method of using transform coefficients enables good use of the characteristics of a broader range, without increasing the differential values to be used for calculation of the gradient values.

Further, when the block size exceeds a predetermined size such as 64×16, it is effective to use the following method, a method of measuring the magnitude of the gradient value using transform coefficients only.

$$gi = 0 \ (\text{low frequency component quantity} <= TL0 \text{ and high}$$
$$\text{frequency component quantity} <= TH0),$$
$$= 1 \ (\text{other than the above, low frequency component}$$
$$\text{quantity} <= TL1 \text{ and high frequency component}$$
$$\text{quantity} <= TH1),$$
$$= 2 \ (\text{other than the above, high frequency component}$$
$$\text{quantity} <= TH1),$$
$$= 3 \ (\text{other than the above}).$$

[2.5 Calculation of Gradient Value using Prediction Method and Transform Coefficients]

Gradient evaluator 402 may also use a prediction signal that presents a predicting method, output from prediction unit 111.

Specifically, description will be made on the case where the prediction signal output from prediction unit 111 is of DC prediction for performing prediction based on the average value of the surrounding pixel values that have been already decoded and on the case of a prediction signal other than that. When the prediction signal is for DC prediction, gradient index gi is calculated by the gradient value method using the magnitude of the transform coefficients. For example, a prediction method as follows is used.

$gi = 0$ (low frequency component quantity <= $TL0$ and high frequency component quantity <= $TH0$), = 1 (low frequency component quantity <= $TL1$ and high frequency component quantity <= $TH1$), = 2 ($g > T1$ and $g <= T2$), = 3 ($g > T3$).

When the prediction signal is not for DC prediction, gradient index gi is determined using the difference in pixel value, without regard to the magnitude of the transform coefficients.

Here, the operation of filter unit 120 is the same as that in the first embodiment. Now, different points from the first embodiment alone will be described.

[2.6 Description of Weight Coefficient Calculator]

As described in the first embodiment, weight coefficient calculator 403 determines weight coefficients from filter parameters, K1, ..., K2, Kn. The representation format of filter parameters also uses representation format a and representation format b, as described in the first embodiment. Weight coefficient calculator 403 of the second embodiment, using the block size input from block size manager 201, changes the representation format in accordance with the block size.

More specifically, representation format a is used when the block size is 4×4 and 8×8, and representation format b is used when the block size is 32×32 and 64×16.

The reason for determining as above is as follows. For example, with a small block size, a filtering process only for the case where the distance from the boundary is short, is sufficient, so that it is good enough if weight coefficients for that case are obtained. Therefore, representative format a is suitable. With a large the block size, weight coefficients when the distance from the boundary is long are needed. When a filter parameter is defined every distance from the boundary, there occurs the problem that the number of filter parameters becomes large, so that representation format b is suitable.

As has been described heretofore, the image decoding apparatus of the second embodiment decodes block size and filter parameters from coded data, reads out the parameters decoded every block size, in accordance with the magnitude of gradient calculated from the pixel values at the boundary and transform coefficients and performs a filter process in accordance with the weight coefficients calculated from the read filter parameters, whereby it is possible to perform decoding of an image that is close to the image when the image has been coded.

[3. The Third Embodiment]

Next, an image coding apparatus to which the present invention is applied will be described as the third embodiment with reference to the drawings.

[3.1 Configuration of Image Coding Apparatus]

Figure 21:
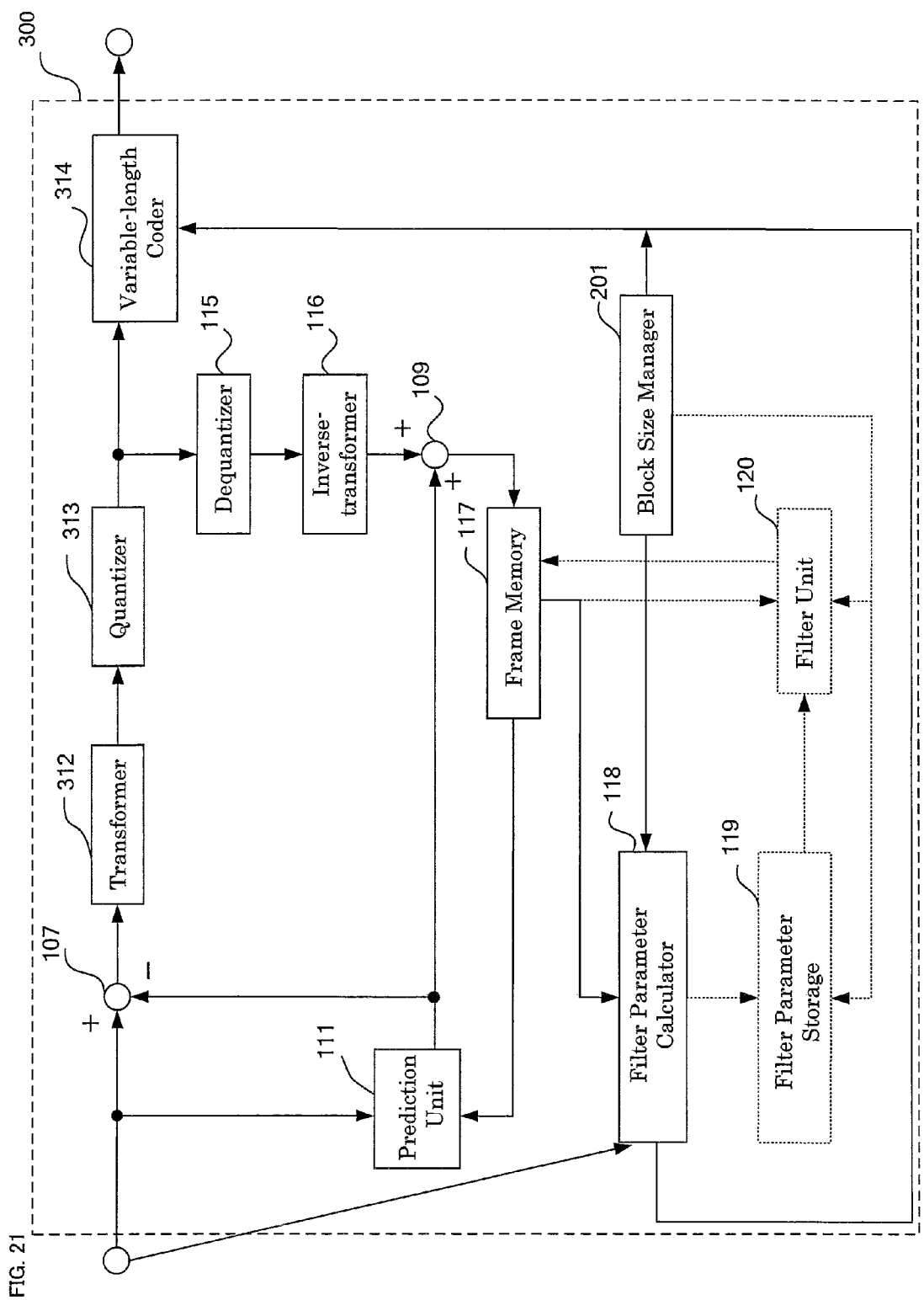
[FIG. 21] is a block diagram showing a configuration of an image coding apparatus of the third embodiment.

FIG. 21 is a block diagram showing a configuration of an image coding apparatus 300 of the third embodiment. Here, the same components as those in the first embodiment and the second embodiment are allotted with the same reference numerals so that their description is omitted.

As shown in FIG. 21, image coding apparatus 300 includes a prediction unit 111, a transformer 312, a quantizer 313, a variable-length coder 314, a dequantizer 115, an inverse transformer 116, a frame memory 117 and a filter parameter calculator 118.

When image coding apparatus 300 performs loop filter processing to reduce distortion of a locally decoded image stored in frame memory 117, the image coding apparatus includes a filter unit 120. In this case, a filter parameter storage 119 that stores filter parameters for controlling filter unit 120 is provided. Now, the operation of image coding apparatus 300 will be described.

[3.2 Operation of Image Coding Apparatus]

The image input to image coding apparatus 300 is decomposed into blocks, and subjected to the following processing. Prediction unit 111 generates prediction blocks close to the input blocks. A subtractor 107 calculates differential value blocks as the differential values between the input blocks and the prediction blocks outputted from prediction unit 111.

Transformer 312 calculates transform coefficients for the differential value blocks input from subtractor 107, by DCT transform and the like. Quantizer 313 quantizes the transform coefficients, in accordance with the step defined by a quantization step. The quantized transform coefficients are coded by variable-length coder 314 and outputted to the outside.

Dequantizer 115 dequantizes the quantized transform coefficients. Inverse transformer 116 inverse-transforms the dequantized transform coefficients to determine residual blocks. Adder 109 calculates the sum of the residual block and prediction block to reproduce the input block. The reproduced block is stored in frame memory 117.

Filter parameter calculator 118 calculates filter parameters. The determined filter parameters are output to variable-length coder 314. Variable-length coder 314 performs variable-length coding of not only the information indicating the predicting method and transform coefficients but also the filter parameters and outputs.

When filter parameter storage 119 is present, the calculated filter parameters are stored into filter parameter storage 119. When filter unit 120 is present, filter unit 120 reads out the filter parameters stored in filter parameter storage 119 and performs a filtering process on the locally decoded image in frame memory 117, in accordance with the values of the filter parameters. The filter-processed image is stored again into frame memory 117.

The operations of filter parameter storage 119 and filter unit 120 are the same as those in the first embodiment and the second embodiment, so that their description is omitted.

[3.3 Description of Filter Parameter Calculator]

Figure 22:
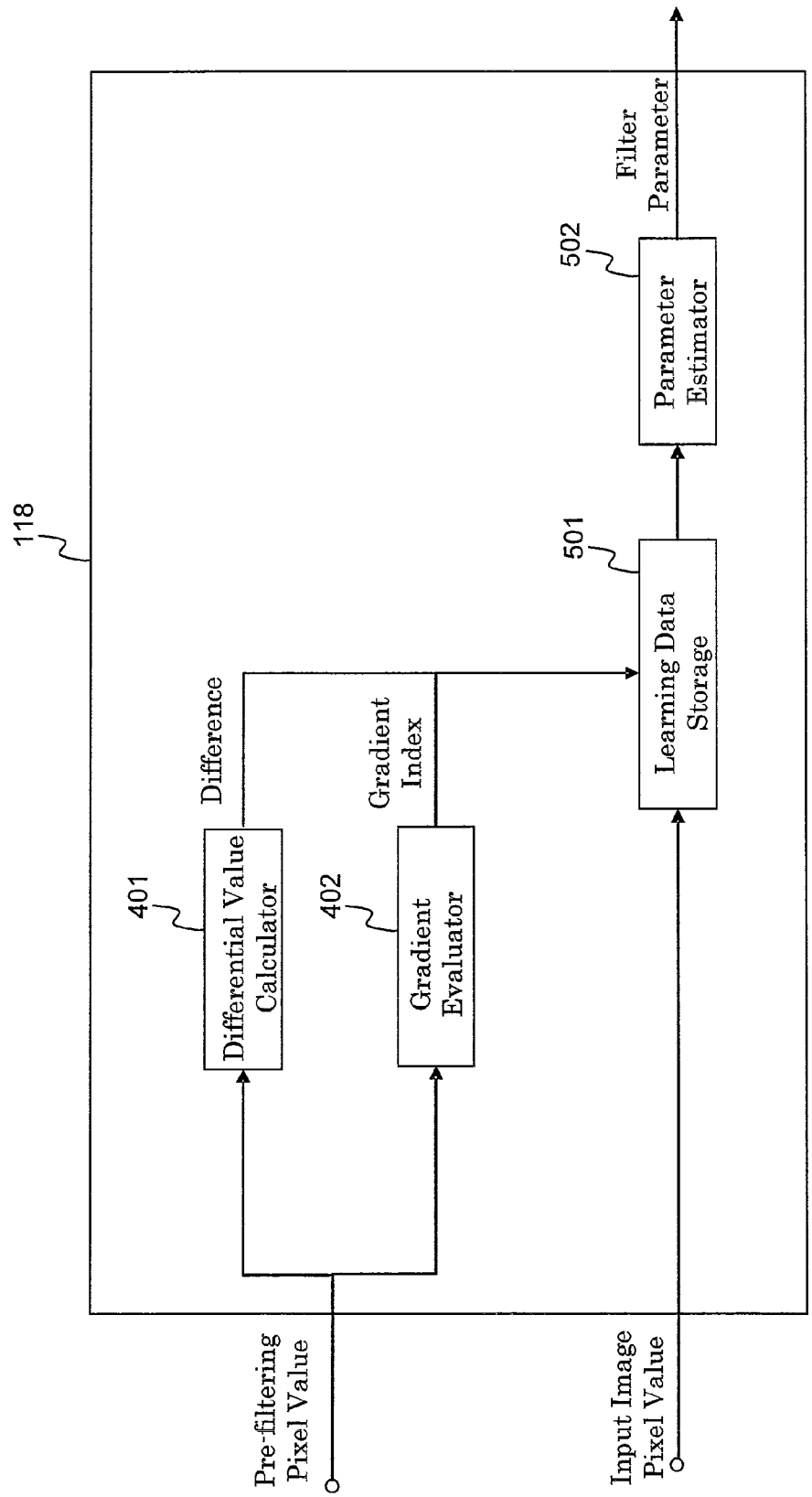
[FIG. 22] is a block diagram showing a configuration of filter parameter calculator in the third embodiment.

Next, the operation of filter parameter calculator 118 will be described. FIG. 22 is a diagram showing the configuration of filter parameter calculator 118. Filter parameter calculator 118 includes a differential value calculator 401, a gradient evaluator 402, a learning data storage 501 and a parameter estimator 502.

As described in the first embodiment, differential value calculator 401 calculates an absolute differential value d as the differential value between the pixel values of a target block and an adjacent block. As described in the first embodiment and the second, gradient evaluator 402 calculates a gradient index as information representing the magnitude of gradient, using pixel values read out from frame memory 117 or the transform coefficients output from dequantizer 115.

Learning data storage 501 determines whether the absolute differential value d calculated at differential value calculator 401 is less than threshold Th1. In other words, it is determined whether $d<\alpha$ holds ($\alpha$=threshold Th1). When the absolute differential value d is less than threshold Th1, or when $d<\alpha$ holds, learning data storage 501 stores learning data for every gradient index.

[3.4 Description of Linear Predictive Parameter Estimation]

Before explaining the operation of learning data storage 501, the method of estimating linear predictive parameters will be described.

Generally, when a value y is linearly predicted using a vector x of m values (x1, x2, ..., xm) and m weight coefficients (a0, a1, ..., am), y can be represented as $$y = a1 \times x1 + a2 \times x2 \ldots am \times xm + \epsilon$$

where $\epsilon$ is a prediction residual.

When n pairs of vector x and y are collected, determination of the weight coefficients m that minimize the sum of squares of n $\epsilon$s will be considered. Using an index t (t=1 to n), n pieces of data are denoted by (x1t, x2t, ..., xmt) and yt, and a matrix X with n rows and m columns and m-column vectors Y, A and E will be defined as follows:—

[Math 1]

$$X = \begin{pmatrix} x_{11} & x_{21} & \cdots & x_{m1} \\ x_{12} & x_{22} & \cdots & x_{m2} \\ \vdots & \vdots & \ddots & \vdots \\ x_{1n} & x_{2n} & \cdots & x_{mn} \end{pmatrix} \qquad (3\text{-}1)$$

[Math 2]

$$Y = \begin{pmatrix} y_1 \\ y_2 \\ \vdots \\ y_n \end{pmatrix}, \ A = \begin{pmatrix} a_1 \\ a_2 \\ \vdots \\ a_n \end{pmatrix}, \ E = \begin{pmatrix} e_1 \\ e_2 \\ \vdots \\ e_n \end{pmatrix} \qquad (3\text{-}2)$$

When using the matrix and vectors, the above equation of linear prediction can be written as $$Y = XA + E.$$

The problem to determine A ($=A^{\wedge}$) for making residual E in this equation, or more specifically, the sum of squares of $\epsilon$ minimum, is generally known as a normal equation, as follows:—

$$X^T X A^{\wedge} = X^T Y$$

It is understood from this equation that the necessary learning data to determine parameter $A^{\wedge}$ is am-row m-column matrix $X^T X$ and a m-column vector $X^T Y$. Accordingly, filter parameter calculator 118 stores these.

Specifically, storage of the matrix data is executed by storing individual elements of the matrix. That is, m×m pieces of data and m pieces of data (in total, m×m+m pieces of data) are stored.

Herein, the i-row j-column element $XX_{ij}$ of $X^T X$ is represented as

[Math 3]

$$XX_{ij} = \sum_{t=1}^{n} x_{it} x_{jt}. \qquad (3\text{-}3)$$

The i-row element $XY_i$ of $X^T Y$ is represented as

[Math 4]

$$XY_i = \sum_{t=1}^{n} x_{it} y_t. \qquad (3\text{-}4)$$

The above equation means to determine the sum of the terms in $\Sigma$, from t=1 to n. Considering the fact that the value of the equation is determined when t is given, it is possible to calculate the value at each point of t (t=1 to n), one after another, before reaching n.

More specifically, if $XX_{ij}$ with t pieces of data given is written as $XX_{ijt}$ and $XY_i$ as $XY_{it}$, XX and XY when one piece of data is given (t=1) are calculated as $$XX_{ij1} = x_{i1} x_{j1}$$

$$XY_{i1} = x_{i1} y_1.$$

Then, when data t (t is an integer from 2 to n) is obtained, the XX and XY values are successively updated as:

$$XX_{ijt} = XX_{ijt-1} + x_{it} x_{jt} \qquad (3\text{-}5)$$

$$XY_{it} = XY_{it-1} + x_{it} y_t \qquad (3\text{-}6).$$

Since the final matrix $XX_{ij}$ and $XX_{ijt}$, which is used for successive calculation, are m-row m-column matrixes, and the final vector $XY_i$ and vector $XY_{it}$, which is used for successive calculation, are m-row vectors, (m×m+m) pieces of memory areas are needed as the necessary storage area when the number of parameter is m.

[3.5 Learning Data for Filter Processing]

Next, the specific learning data for filter processing will be described. When the post-filtering pixel value of a filtering target pixel Pk located a distance k away from the boundary is denoted as pk', the filter processing is expressed by $$pk' = \Sigma \alpha ki \times pi + \Sigma \beta ki \times qi + \gamma k \qquad (3\text{-}7),$$

where pi (k=0 to l−1) is the pixel value of a pixel that is located on the same side as the filtering target pixel, a distance i away from the block boundary, qi (i=0 to m−1) is the pixel value of a pixel that is located on the side other than the filtering target pixel, a distance i away from the block boundary, αki (i=0 to l−1), βki and γk are weight coefficients for the filtering target pixel located distance k away from the boundary.

The post-filtering pixel value is given by pk', and it is considered that the condition in which this value is closest to the pixel value ppk of the input image is suitable. Accordingly, determination of (l+m+1) parameters αki, βki and γ is demanded. In this case, it is necessary to determine (l+m+1) row (l+m+1) column matrixes and (l+m+1) vectors in a successive manner as the learning data.

[3.6 Learning Data in the Present Embodiment]

The filter parameters in the present embodiment are represented by representation format a and representation format b, as described in the first embodiment. Learning data storage 501 stores different learning data, depending on what representation format is used for the filter parameters.

For representation format a, the filter parameters represent the weight coefficients in the filtering process. Accordingly, learning data for determining weight coefficients is stored.

Suppose that the weight coefficient when the distance from the boundary is k is Wk, the filtering process is expressed by $$pk' = Wk \times pk + (1 - Wk) \times q0 \qquad (3\text{-}8).$$

This can be rewritten in another way as $$pk' - q0 = Wk \times (pk - q0) \qquad (3\text{-}9).$$

Since, in this linear prediction, only a single parameter m is to be determined, the matrix XX (k) and vector XY (k) when the distance from the boundary is k, are both scalar.

When the input image corresponding to filtering target pixel pk is assumed to be ppk, the matrix and vector for data index t (t is an integer from 1 to n) are determined from equations (3-3) and (3-4) as follows:—

[Math 5]

$$XX(k) = \sum_{t=1}^{n}(pk_t - q0_t) \quad (3\text{-}10)$$

[Math 6]

$$XY(k) = \sum_{t=1}^{n}(ppk_t - q0_t)(pk_t - q0_t). \quad (3\text{-}11)$$

Learning data storage 501 calculates the values of XX (k) and XY (k) for each gradient value parameter or for each distance k from the boundary.

For representation format b, the filter parameters represent the parameters of a formula for calculating the weight coefficients of the filtering process. As has been described in the first embodiment, the weight coefficients are determined by $$Wk = K1 - K2 \times k \quad (k < K2)$$
$$= 0 \quad (k >= K2).$$

Using the parameters, the formula of the filtering process can be expressed as $$pk' = (K1 - K2 \times k)pk + (1 - K1 + K2 \times k)q0$$
$$= K1(pk - q0) + K2(k \times q0 - k \times pk) + q0.$$

This can be transformed as $$ppk - q0 = a1(pk-q0) + a2\ (k \times q0 - k \times pk) + \epsilon$$

Accordingly, as the learning data for determining filter parameters K1 and K2, with x1 and x2 set as $$x1 = pk - q0$$

$$x2 = k \times q0 - k \times pk,$$

XX and XY may be calculated as shown in formula (3-5) and formula (3-6) and stored.

As the learning data, values for every gradient value are stored in both representation format a and representation format b. As the number of learning data, (m×m+m)×(the number of gradient indexes)×(the number of distance k from the boundary) pieces of learning data are needed in the case of representative format a if m parameters for linear prediction is present.

In the above description, since m, which is the number of parameters, is 1, if, for example, the number of gradient indexes is set at 4 and distance k from the boundary is set at 8, 64 (=(1×1+1)×4×8) pieces of learning data are needed.

In the case of representative format b, (m×m+m)×(the number of gradient indexes) pieces of learning data are needed. In the above description, since m, the number of parameters is 2, if, for example, the number of gradient indexes is set at 4, 48 (=(2×2+2)×4) pieces of learning data are needed.

Figure 23:
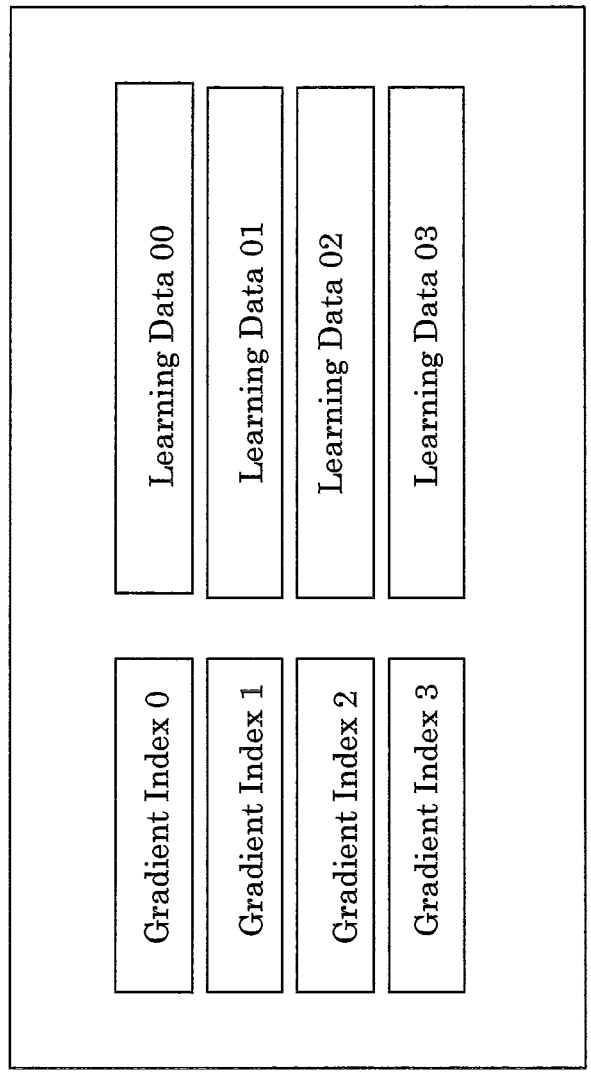
[FIG. 23] is a diagram explaining the operation of a learning data storage in the third embodiment.
Figure 24:
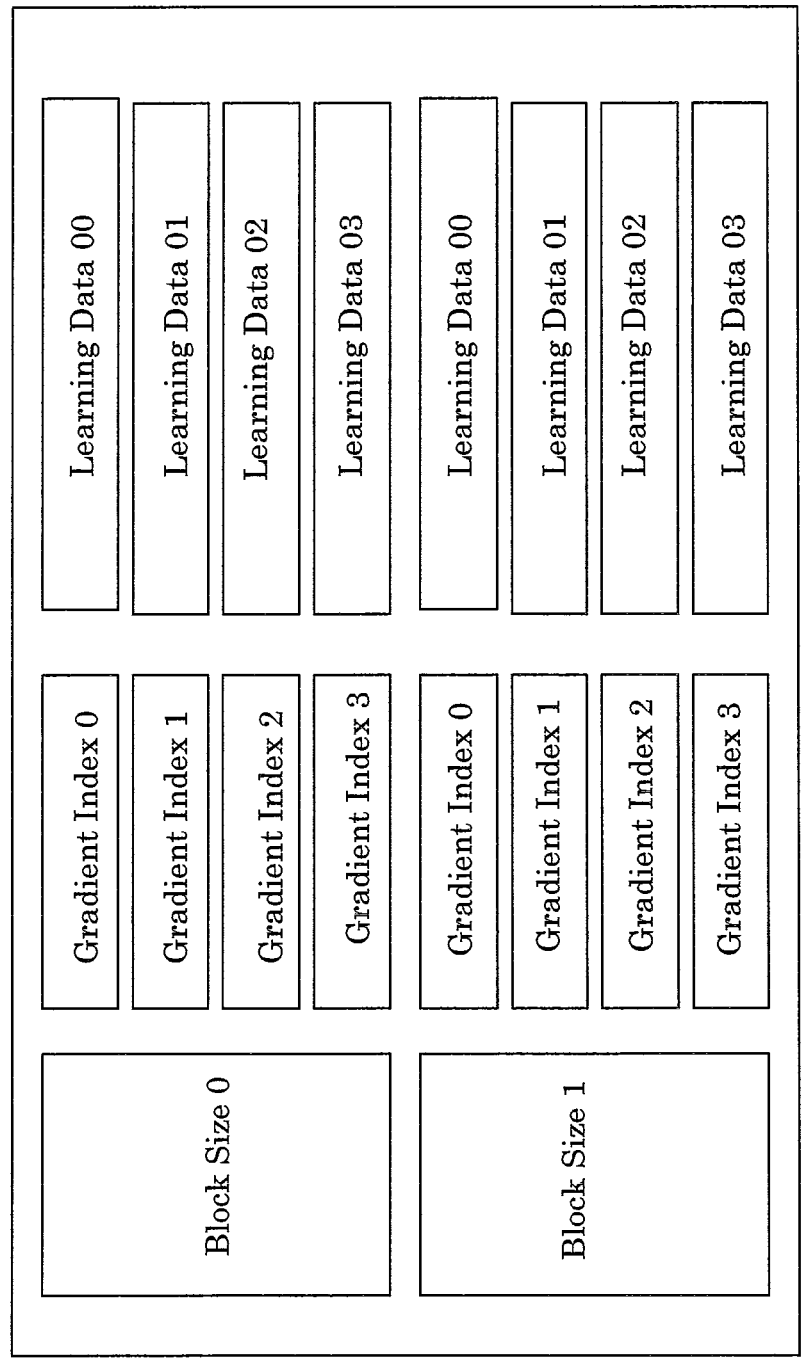
[FIG. 24] is a diagram explaining the operation of a learning data storage in the third embodiment.
Figure 25:
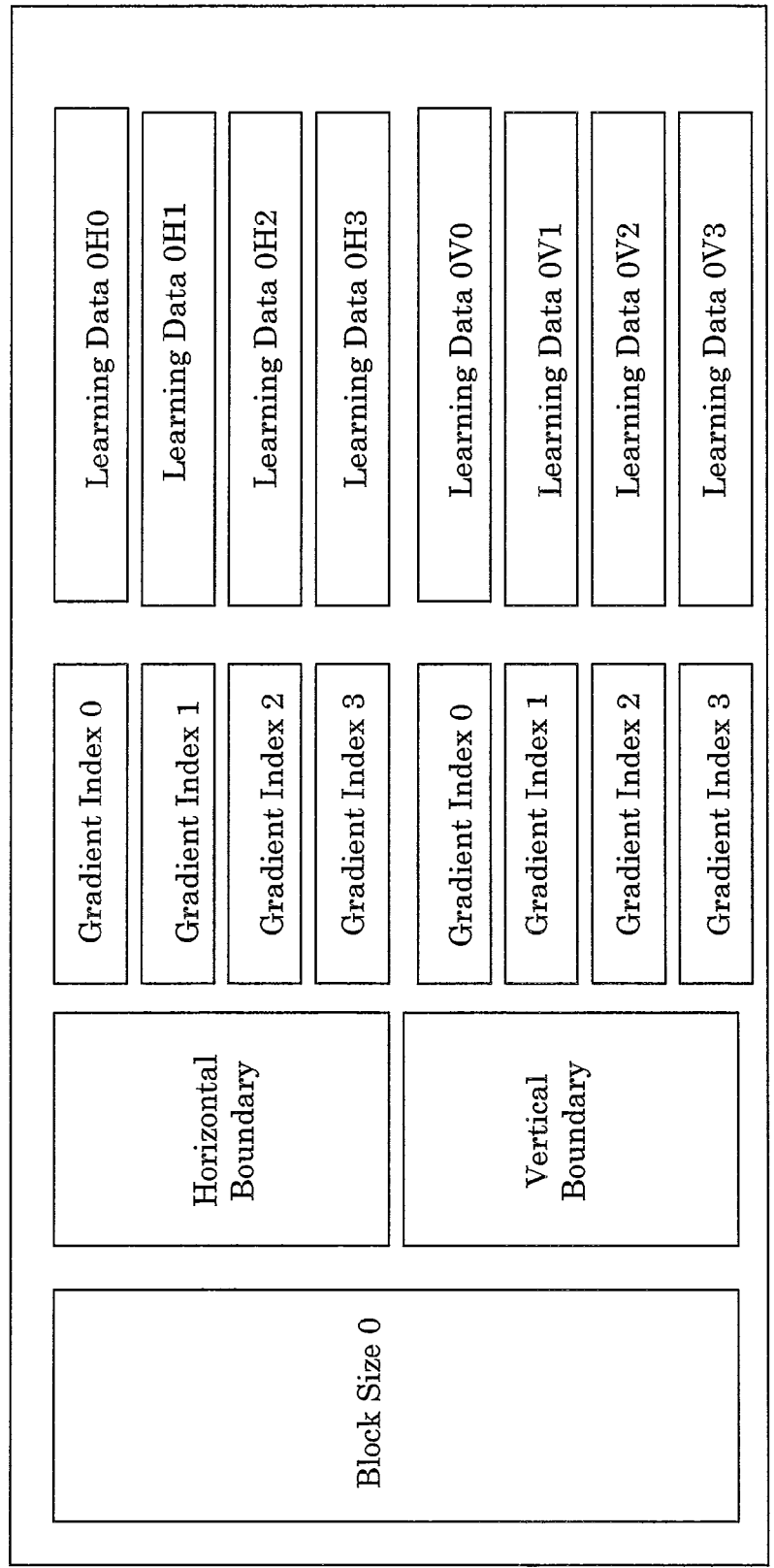
[FIG. 25] is a diagram explaining the operation of a learning data storage in the third embodiment.
Figure 26:
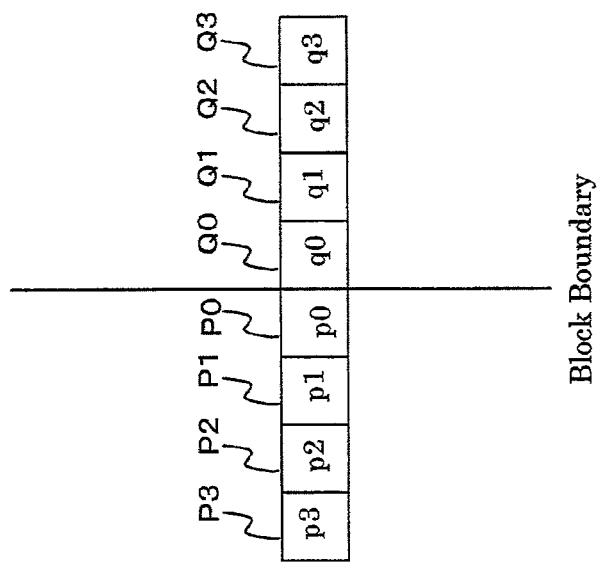
[FIG. 26] is a diagram explaining a boundary in the prior art.

FIGS. 23, 24 and 25 schematically show data to be stored in learning data storage 501. As shown in FIG. 23, learning data storage 501 stores learning data for each individual gradient index. As described above, the learning data in representation format a is given as the values of XX(k) and XY(k) for every distance k for each individual gradient, whereas the learning data in representation format b is given as XX and XY for each individual gradient.

It is preferable that learning data storage 501 stores learning data for each block size, in accordance with the outputted from block size manager 201. In this case, learning data is stored every gradient index, separately for each block size, as shown in FIG. 24.

Further, it is also preferable that learning data is further classified into those for horizontal boundary and those for vertical boundary, as shown in FIG. 25. In particular, when the block size is large, and when the size of the block width and the size of the height are different, it is preferable if learning data is stored, being classified into horizontal and vertical boundary categories.

[3.7 Description of Parameter Estimator]

Parameter estimator 502 estimates linear prediction parameters, using data stored in learning data storage 501. In the description of the present embodiment, estimation based on least squares is used.

[3.8 Linear Prediction Parameter Estimation by Least Squares]

When the above-described m row m column learning data XX and m row learning data XY are used, linear prediction parameter A that minimizes the sum of squares of errors can be given by the following normal equation.

$$X^T X A\hat{} = X^T Y.$$

In general, parameter A^ as the solution of this normal equation can be calculated by determining the inverse matrix of XX.

Specifically, when the number of parameters is 1, the inverse matrix is 1/XX, which is given simply by division. When the number of parameters is two or three, the inverse matrixes can be easily calculated by simple formulas.

It becomes difficult to determine an inverse matrix as the number of parameters increases. In this case, it is the best in view of computational complexity to determine A without using an inverse matrix, by using a known technique, namely, LU decomposition.

In LU decomposition, XX is decomposed into an m row m column lower triangular matrix L and an m row m column upper triangular matrix U. This decomposition can be done using a known technique such as the Doolittle method or the Crout method. By this decomposition, the normal equation is represented as $$LUA = XY.$$

To begin with, using a known technique called Gaussian elimination, a matrix Z that satisfies UZ=XY is obtained. Then, Gaussian elimination is used once again to determine A that satisfies LA=Z. By this calculation, it is possible to easily calculate even when 100 or more parameters are involved.

Here, it is also possible to solve A that satisfies XXA=XY by directly using Gaussian elimination, without use of LU decomposition. The computational complexity in this case is lower than that of the case where a solution is given by calculating the inverse matrix and, the computational complexity becomes greater than that of the case where LU decomposition is used.

A parameter estimator 105 determines a parameter from learning data, using learning data for every gradient value.

When the parameter is one weight coefficient that is determined in accordance with distance k, this is the case where learning data that is given by formula (3-8) and formula (3-9) as already shown, and weight coefficient Wk is determined by division.

$$Wk = XY/XX.$$

Here, if the learning data is given separately depending on the block size, the parameter is determined for each block size.

When the number of parameters for the learning data stored in learning data storage 501 is two or three, the inverse matrix of XX is determined so as to calculate the parameters by using $$A\hat{\ }(X^TX)^{-1}X^TY.$$

When the number of parameters is three or greater, the parameters are determined by a method using LC decomposition or Gaussian elimination. A method using LC decomposition or Gaussian elimination may also be used when the number of parameters is one to three.

The calculated filter parameters are outputted to variable-length coder 314. The filter parameters outputted to variable-length coder 314 are variable-length coded into coded data, which is outputted to the outside of image coding apparatus 300. When the filter parameters are real numbers, it is suitable that the parameters are multiplied by, for example, the n-th power of 2 to be integerized into n-bit integers. Here, n is a predetermined constant.

Though in the above description, the filter parameters are variable-length coded, it is also possible to configure a system in which, instead of performing variable-length coding of the calculated filter parameters, the same values are provided for the image coding apparatus and the image decoding apparatus.

As has been described heretofore, the image coding apparatus according to the third embodiment stores learning data, which are values calculated from a filtering target pixel, its surrounding pixel values and the input image, for each individual gradient value, and calculates filter parameters for each gradient value using the stored learning data, whereby it is possible to obtain filter parameters to determine the optimal weight coefficients for a filtering process. Further, variable-length coding of the filter parameters enables the image decoding apparatus to perform a filtering process using the optimal weight coefficients, hence improves coding efficiency.

| Description of Reference Numerals | |
|---|---|
| 100 | image decoding apparatus |
| 200 | image decoding apparatus |
| 300 | image coding apparatus |
| 111 | prediction unit |
| 114 | variable-length coding decoder |
| 115 | dequantizer |
| 116 | inverse-transformer |
| 117 | frame memory |
| 118 | filter parameter calculator |
| 501 | learning data storage |
| 502 | parameter estimator |
| 119 | filter parameter storage |
| 120 | filter unit |
| 401 | differential value calculator |
| 402 | gradient evaluator |
| 601 | differential value calculator |
| 602 | gradient value calculator |
| 603 | gradient index calculator |
| 604 | frequency component quantity calculator |
| 403 | weight coefficient calculator |
| 404 | pixel value calculator |
| 201 | block size manager |
| 312 | transformer |
| 313 | quantizer |
| 314 | variable-length coder |

The invention claimed is:

1. An image decoding apparatus comprising;
    a filter parameter decoding circuit configured to decode one or more sets of filter parameters from coded data;
    a filtering circuit configured to perform a filtering process by multiplying weight coefficients and reference pixels that are made up of a pixel to be targeted for the filtering process and pixels in a vicinity of the pixel to be targeted;
    an index calculating circuit configured to calculate an amount of variation in said reference pixels and an index for said pixel to be targeted by classifying a magnitude of the amount of variation based on a group of predetermined threshold values; and
    a weight coefficient calculating circuit configured to derive the weight coefficients according to positions of the reference pixels with respect to the pixel to be targeted and a corresponding set of filter parameters, wherein
    the weight coefficient calculating circuit includes a selecting circuit configured to select said corresponding set of filter parameters from said sets of filter parameters, in accordance with the calculated index.

2. The image decoding apparatus according to claim 1, wherein the decoding circuit is further configured to decode information on a plurality of blocks of different sizes from the coded data, and
    the filtering circuit configured to perform a filtering process on image data for each of the blocks.

3. The image decoding apparatus according to claim 1, wherein when image information that has been divided into blocks and coded is decoded, the filtering circuit is configured to correct a pixel value of a processing target pixel that is located near a boundary between a certain block and an adjacent block adjoining the certain block and that belongs to the certain block, and,
    when a size of said certain block is a predetermined size or greater, the index calculating circuit is configured to calculate the index for said processing target pixel,based on a magnitude of a difference between pixel values of two pixels or more belonging to said certain block, or based on a magnitude of a difference between pixel values of two pixels or more belonging to the adjacent block.

4. The image decoding apparatus according to claim 3, wherein the weight coefficient calculating circuit is configured to calculate weight coefficients for the filtering process, in accordance with said corresponding set of filter parameters selected by the selecting circuit and a distance from the processing target pixel the boundary.

5. An image decoding apparatus comprising:
    a decoding circuit configured to decode a prediction residual signal and a prediction signal from coded data;
    a generating circuit configured to generate a prediction residual by dequantizing and inverse transforming the prediction residual signal decoded by the decoding circuit configured to decode image data from the prediction residual and the prediction signal; an index calculating circuit configured to calculate an amount of variation in a pixel value in a vicinity of a pixel to be targeted for a filtering process, and configured to calculate an index by classifying a magnitude of the amount of variation based on a group of predetermined threshold values; and
    a filtering circuit configured to perform the filtering process on the image data, in accordance with the index calculated by the index calculating circuits, wherein
    the index calculating circuit configured to calculate the index based on a magnitude of transform coefficients for the block to be targeted for the filtering process, and a magnitude of differences between the filtering target pixel and pixels in a vicinity of the target pixel.

* * * * *